(12) United States Patent
Ito et al.

(10) Patent No.: US 7,436,995 B2
(45) Date of Patent: Oct. 14, 2008

(54) IMAGE-PROCESSING APPARATUS, IMAGE-CAPTURING APPARATUS, IMAGE-PROCESSING METHOD AND IMAGE-PROCESSING PROGRAM

(75) Inventors: Tsukasa Ito, Musashino (JP); Jun Minakuti, Sakai (JP); Takeshi Nakajima, Hino (JP); Hiroaki Takano, Hachioji (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 838 days.

(21) Appl. No.: 11/034,311

(22) Filed: Jan. 12, 2005

(65) Prior Publication Data

US 2005/0168596 A1    Aug. 4, 2005

(30) Foreign Application Priority Data

Jan. 22, 2004 (JP) ............................ 2004-014231

(51) Int. Cl.
*G06K 9/00* (2006.01)
(52) U.S. Cl. ..................... 382/162; 382/167; 382/274
(58) Field of Classification Search ................ 382/162, 382/267, 274; 348/222.1
See application file for complete search history.

(56) References Cited

U.S. PATENT DOCUMENTS 6,594,388 B1 * 7/2003 Gindele et al. ............... 382/167
7,027,067 B1 * 4/2006 Ohga ........................ 345/589

* cited by examiner

*Primary Examiner*—Phuoc Tran
(74) *Attorney, Agent, or Firm*—Lucas & Mercanti, LLP

(57) ABSTRACT

An image processing apparatus for converting photographed image data representing a scene luminance into visual image data representing a visual image, comprises a data analyzing section to obtain a viewing condition to view a visual image, to analyze the photographed image data, and to obtain an image converting condition and a viewing condition parameter for a color management employing a color appearance model on the basis of the analysis result of the photographed image data and the viewing condition for the visual image; an image converting section to convert the photographed image data on the basis of the image converting condition obtained by the data analyzing section so as to produce the visual image data; and a formatting section to attach the viewing condition parameter to the visual image data produced by the image converting section and to output the visual image data attached with the viewing condition parameter.

12 Claims, 13 Drawing Sheets

FIG. 3

SELECTION OF observing-condition

- ● DISPLAY ON CRT (OFFICE)
- ○ DISPLAY ON CRT (HOME)
- ○ PROJECTED BY PROJECTOR (DARKROOM)
- ○ PROJECTED BY PROJECTOR (HALF BRIGHT ROOM)
- ○ L-SIZE PRINT
- ○ POSTER

L_A : LUMINANCE IN ADAPTING FIELD c   : (Impact of surround)
Nc  : (Chromatic induction factor)
F_LL : (Lightness cntrast factor)
F   : (Factor for degree of adaptation)

FL  : (liminance - level adaptation factor)
n   : (Background induction factor)
Nbb : (Background brightness induction factor)
Ncb : (Chromatic braightness induction factor)

IMAGE-PROCESSING APPARATUS, IMAGE-CAPTURING APPARATUS, IMAGE-PROCESSING METHOD AND IMAGE-PROCESSING PROGRAM

BACKGROUND OF THE INVENTION

The present invention relates to image-processing apparatus for processing image data, image-capturing apparatus equipped with the same, image-processing method and image-processing program.

At present, the digital image data acquired by scanning a color photo-film or the digital image data captured by an image-capturing apparatus, such as a digital camera, etc., is distributed through such a memory device as a CD-R (Compact Disk Recordable), a flexible disc and a memory card or the Internet, and is displayed on such a display monitor as a CRT (Cathode Ray Tube), a liquid crystal display and a plasma display or a small-sized liquid crystal monitor display device of a cellular phone, or is printed out as a hard copy image using such an output device as a digital printer, an inkjet printer and a thermal printer. In this way, displaying and printing methods have been diversified in recent years.

However, since color regions and/or gradation characteristics established for various kinds of displaying/printing devices are different from relative to each other corresponding to principles and internal configurations employed in the displaying/printing devices, there have been many cases that an "appearance" of image reproduced on the basis of the same image data varies with a wide variety of displaying/printing methods to be employed. To eliminate such the variation of the "appearance", many efforts have been implemented so far.

For instance, there has been an attempt that a color space represented by RGB digital signals is standardized into another color space, which is independent of characteristics of the image-capturing apparatus. At present, the sRGB (refer to "Multimedia Systems and Equipment—Color Measurement and Management—Part 2-1: Color Management—Default RGB Color Space—sRGB" IEC61966-2-1) have been employed for most of digital image data as a standardized color space. The color space of this sRGB has been established to meet the color reproduction area for a standard CRT display monitor.

However, the color reproduction area of an image displayed on the displaying device, such as a CRT display monitor, etc., or that of a hard-copy image printed by one of various kinds of printing devices varies with a fluorescent material or a combination of dye materials to be employed. For instance, the color reproduction area, reproduced by the CRT display monitor corresponding to the sRGB standard color space, includes a wide area of bright green and blue, and an area which could not be reproduced by a silver-halide print, an ink-jet print and a printed hard-copy. Conversely, a cyan area reproduced by the ink-jet print and the printed hard-copy or a yellow area reproduced by the silver-halide print includes an area which could not be reproduced by the CRT display monitor (for instance, refer to "Fine Imaging and Digital Photograph" p. 444, edited by Publishing Committee of Society of Photographic Science and Technology, Japan, published by Corona Co.).

To cope with the problem mentioned in the above, the ICC Profile Format specified by the ICC (International Color Consortium) has been frequently employed so far. The method according to the ICC Profile Format includes the steps of: attaching first color space information of a first device to first image data, which are generated under an intention of rendering the first device to reproduce an image based on the first image data; when a second device is employed for reproducing the image, converting the first image data to third image data in the PCS (Profile Connection Space) color space, which is independent of a specific device, based on the first color space information; and in the next step, converting the third image data to second image data suitable for the image reproduction by the second device, based on the second color space information for the second device. According to this method, the color reproducibility of colorimetry values measured by the colorimeter between the color reproducing devices has been considerably improved.

It is well known, however, that there have been many cases that, even when the colorimetry values are precisely reproduced, the "color appearance" is different for the real viewer. This is because, the human eyes do not sense an absolute colorimetry value as his visual sense, but changes the "color appearance" in its adaptation state corresponding to viewing conditions (such as brightness of a peripheral area, background, etc.). For instance, since the general viewing conditions and adaptation states of an image reproduced by an illumination displaying device like the CRT and that formed on a reflection displaying material like the printed matter are different from each other, there are many cases that the "color appearances" of them do not coincide with each other, even if the colorimetry values of them coincide with each other.

To cope with the problems mentioned in the above, there has been well known the color managing method, which employs a color appearance model. The color appearance model is such a model that is used for predicting the "color appearance" under a wide variety of the viewing conditions. Concretely speaking, the value representing the "color appearance" under a designated condition is derived from the colorimetry values by conducting a conversion based on the viewing condition parameters. For instance, CIECAM97s, which was recommended as a standard model by the CIE (International Commission on Illumination), has been frequently employed as such the color appearance model. Further, the CIE will issue a recommendation of the CIECAM02 as an improved version of CIECAM97s, later soon (for instance, refer to Non-patent Document 1).

Other than the above, various kinds of the color appearance models, such as the Noya model, the Hunt model, the RLab model, the LLab model, etc., were already announced so far. As concretely examples of the viewing condition parameters to be employed for the calculations in such the color appearance models, the adapting field luminance, the tristimulus values of white in the adapting field, the relative luminance of the source background, the impact of surround, etc. can be cited. FIG. 13 shows concrete viewing condition parameters. For instance, the concrete viewing condition parameters as cited in FIG. 13 are defined in the CIECAM97s.

When employing such the color appearance model, for instance, the first image data, which are created with the intention of reproducing its image under the first viewing condition, can be converted to the values representing the "color appearance" by applying the first image data to the color-appearance model transform on the basis of the first viewing condition parameters corresponding to the first viewing condition. Then, the values representing the "color appearance" can be converted to the second image data, which is intended to reproduce its image under the second viewing condition, by applying the values representing the "color appearance" to the color-appearance model inverse-transform on the basis of the second viewing condition parameters corresponding to the second viewing condition. According to the method mentioned in the above, it becomes possible to make the "color appearance" under the first viewing condition and that under the second viewing condition coinciding with each other, even if the first viewing condition and the second viewing condition are different form each other (for instance, refer to Non-patent Document 1).

As described in the above, to implement the color management employing the color appearance model, it is necessary to input the viewing condition parameters corresponding to the viewing condition intended, as well as the image data.

Patent Document 1

Tokkaihei 7-222196 (Japanese Non-Examined Patent Publication)

Non-patent Document 1

"COLOR APPEARANCE MODEL—SUMMARY AND PROBLEM OF CIECAM02" by Hirohisa Yaguchi, ABSTRACT COLLECTION OF THE COLOR FORUM 2003 OF THE INSTITUTE OF IMAGE ELECTRONICS ENGINEERING OF JAPAN, 2003, P. 57

Incidentally, when image data is generated by conducting an image-capturing operation by means of, for instance, a digital camera, it is necessary to determine the viewing condition parameters corresponding to the image data in advance, in order to apply the color management employing the color appearance model to the image data. It would be a problem how to establish the viewing condition parameters.

It is cumbersome to measure the viewing condition parameters (such as the adapting field luminance, the tristimulus values of white in the adapting field, the relative luminance of the source background, the impact of surround, etc.) of the scene observer, who is present at the captured scene, every time when capturing the scene. Specifically, as for a high contrasted image, the viewing condition parameters depend on a place where the observer's notice is directed. It is difficult, however, to measure a visual axis of the observer, every time when capturing the scene.

Further, when the viewing condition parameters are intended to be attached to the "image data representing a visual image", the luminance of the scene should be converted to that of the visual image according to the viewing condition intended for the visual image, and, in addition, it is necessary to calculate concrete viewing-condition parameters, which strictly represent the viewing condition intended for the visual image.

As mentioned in the above, the operation for attaching appropriate viewing-condition parameters to the image data is difficult task, and therefore, it is virtually impossible especially for an operator who has no specific knowledge about the color appearance model to calculate such the appropriate viewing-condition parameters.

SUMMARY OF THE INVENTION

To overcome the abovementioned drawbacks in conventional image-processing method and apparatus, it is an object of the present invention to provide image-processing method and apparatus, which make it possible to easily generate the image data being applicable for the color appearance model from captured image data outputted by the digital camera, etc., without conducting specific measurements and without requiring special technical knowledge.

Accordingly, to overcome the cited shortcomings, the abovementioned object of the present invention can be attained by image-processing methods and apparatus described as follow.

An image processing apparatus for converting photographed image data representing a scene luminance into visual image data representing a visual image, comprising:

a data analyzing section to obtain a viewing condition to view a visual image, to analyze the photographed image data, and to obtain an image converting condition and a viewing condition parameter for a color management employing a color appearance model on the basis of the analysis result of the photographed image data and the viewing condition for the visual image;

an image converting section to convert the photographed image data on the basis of the image converting condition obtained by the data analyzing section so as to produce the visual image data; and a formatting section to attach the viewing condition parameter to the visual image data produced by the image converting section and to output the visual image data attached with the viewing condition parameter.

An image processing method of converting photographed image data representing a scene luminance into visual image data representing a visual image, comprises:

a data analyzing process to obtain a viewing condition to view a visual image, to analyze the photographed image data, and to obtain an image converting condition and a viewing condition parameter for a color management employing a color appearance model on the basis of the analysis result of the photographed image data and the viewing condition for the visual image;

an image converting process to convert the photographed image data on the basis of the image converting condition obtained by the data analyzing process so as to produce the visual image data; and a formatting process to attach the viewing condition parameter to the visual image data produced by the image converting process and to output the visual image data attached with the viewing condition parameter.

BRIEF DESCRIPTION OF THE DRAWINGS

Other objects and advantages of the present invention will become apparent upon reading the following detailed description and upon reference to the drawings in which:

FIG. 3 shows dialogue window DI for selecting one of visual image observing conditions;

DETAILED DESCRIPTION OF THE PREFERRED EMBODIMENT

Figure 1:
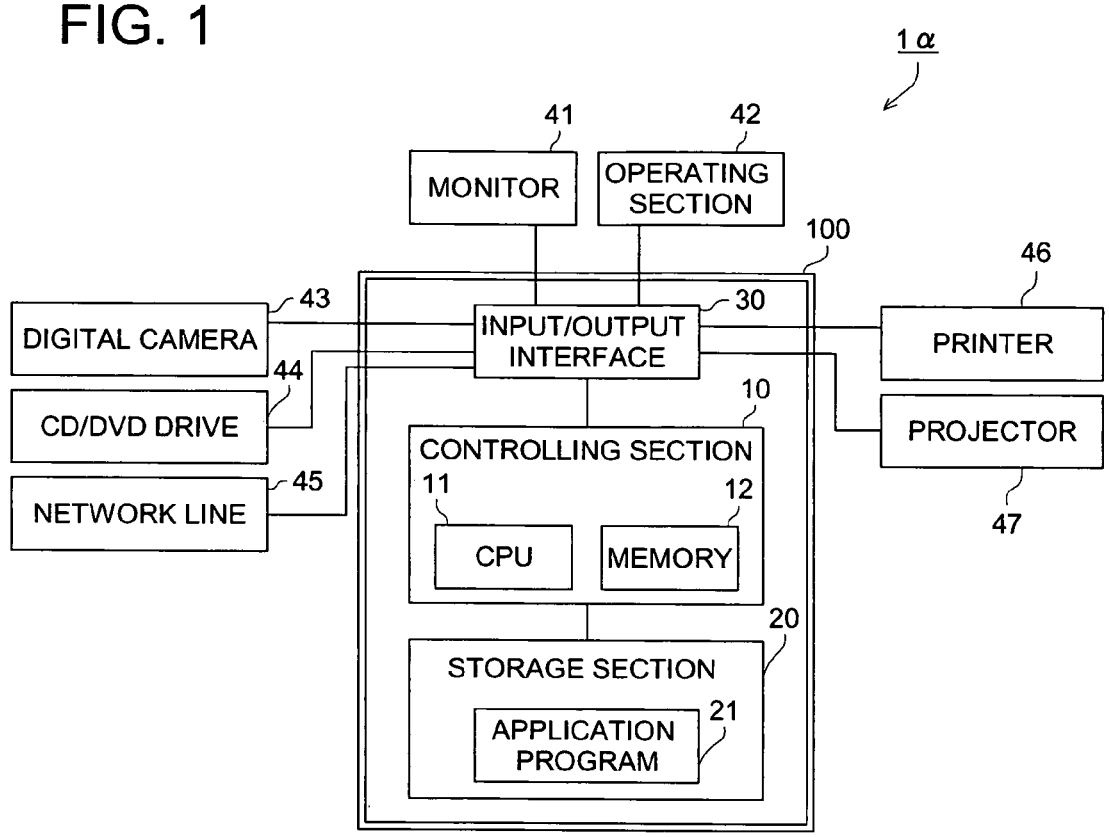
FIG. 1 shows a schematic diagram of a configuration of image-processing system 1α embodied in the present invention.

Further, to overcome the abovementioned problems, other image-processing methods and apparatus, embodied in the present invention, will be described as follow:

(1) An image-processing apparatus for transforming "image data representing the scene luminance" based on captured image data to "image data representing the visual image", characterized by comprising:

a data analyzing section that acquires an observing-condition intended by a visual image, and analyzes the "image data representing the scene luminance" so as to calculate an image transforming condition from analyzing result of them and the observing-condition intended by the visual image;

an image transform section to transform the "image data representing the scene luminance" to the "image data representing the visual image", based on the image transforming condition calculated by the data analyzing section; and a formatting section to attach observing condition parameters, corresponding to the observing-condition intended by the visual image, to the "image data representing the visual image", transformed by the image transform section, so as to output the "image data representing the visual image" attached with the observing condition parameters.

(2) The image-processing apparatus described in item 1, characterized in that, the image-processing apparatus is provided with an operating section for selecting the observing-condition intended by the visual image; and the data analyzing section calculates the observing-condition parameters corresponding to the observing-condition selected by the operating section; and the formatting section attaches the observing condition parameters, calculated by the data analyzing section, to the "image data representing the visual image", so as to output the "image data representing the visual image" attached with the observing condition parameters.

(3) The image-processing apparatus described in item 1 or 2, characterized in that, the image transforming condition includes a gradation mapping condition for converting a scene luminance to a luminance of the visual image.

(4) The image-processing apparatus described in item 1 or 2, characterized in that, the image transforming condition includes a gradation mapping condition for converting a scene luminance to a luminance of the visual image and a white-balance correction condition.

(5) The image-processing apparatus described in item 3 or 4, characterized in that, the data analyzing section analyzes the "image data representing the scene luminance" by acquiring or estimating a kind of scene from the "image data representing the scene luminance".

(6) The image-processing apparatus described in any one of items 3-5, characterized in that, the data analyzing section calculates a provisional gradation mapping condition under a specific observing condition, and corrects the provisional gradation mapping condition according to the observing condition intended by the visual image, so as to calculate the gradation mapping condition.

(7) The image-processing apparatus described in any one of items 1-6, characterized in that, the data analyzing section calculates the image transforming condition in which the visual image is described in a luminance expanded color space.

(8) The image-processing apparatus described in any one of items 1-7, characterized in that, the formatting section attaches the image transforming condition, calculated by the data analyzing section, to the "image data representing the visual image", so as to output the "image data representing the visual image" attached with the image transforming condition.

(9) The image-processing apparatus described in any one of items 1-8, characterized in that, the observing condition parameters, corresponding to the observing-condition intended by the visual image and to be attached to the "image data representing the visual image", are such observing condition parameters that are employed in the CIECAM97s or the CIECAM02.

(10) An image-capturing apparatus, characterized in that, the image-capturing apparatus is provided with:

an image-capturing section to output captured image data acquired by photographing a subject;

an image creating section to create "image data representing the scene luminance" from the captured image data outputted by the image-capturing section; and the image-processing apparatus described in any one of items 1-9, and the data analyzing section analyzes the "image data representing the scene luminance" created by the image creating section.

(11) An image-processing method for transforming "image data representing the scene luminance" based on captured image data to "image data representing the visual image", characterized by comprising:

a data analyzing process to acquire an observing-condition intended by a visual image, and to analyze the "image data representing the scene luminance" so as to calculate an image transforming condition from analyzing result of them and the observing-condition intended by the visual image;

an image transforming process to transform the "image data representing the scene luminance" to the "image data representing the visual image", based on the image transforming condition calculated in the data analyzing process; and a formatting process to attach observing condition parameters, corresponding to the observing-condition intended by the visual image, to the "image data representing the visual image", transformed in the image transforming process, so as to output the "image data representing the visual image" attached with the observing condition parameters.

(12) The image-processing method described in item 11, characterized in that, the image-processing method further comprises:

a selecting process to select the observing-condition intended by the visual image; and the calculating process to calculate the observing-condition parameters corresponding to the observing-condition selected in the selecting process; and in the formatting process, the observing condition parameters, calculated in the calculating process, are attached to the "image data representing the visual image", so as to output the "image data representing the visual image" attached with the observing condition parameters.

(13) The image-processing method described in item 11 or 12, characterized in that,
the image transforming condition includes a gradation mapping condition for converting a scene luminance to a luminance of the visual image.

(14) The image-processing method described in item 11 or 12, characterized in that, the image transforming condition includes a gradation mapping condition for converting a scene luminance to a luminance of the visual image and a white-balance correction condition.

(15) The image-processing method described in item 13 or 14, characterized in that,
in the data analyzing process, the "image data representing the scene luminance" are analyzed by acquiring or estimating a kind of scene from the "image data representing the scene luminance".

(16) The image-processing method described in any one of items 13-15, characterized in that,
in the data analyzing process, a provisional gradation mapping condition under a specific observing condition are calculated, and the provisional gradation mapping condition is corrected according to the observing condition intended by the visual image, so as to calculate the gradation mapping condition.

(17) The image-processing method described in any one of items 11-16, characterized in that,
in the data analyzing process, the image transforming condition, in which the visual image is described in a luminance expanded color space, is calculated.

(18) The image-processing method described in any one of items 11-17, characterized in that,
in the formatting process, the image transforming condition, calculated in the data analyzing process, is attached to the "image data representing the visual image", so as to output the "image data representing the visual image" attached with the image transforming condition.

(19) The image-processing method described in any one of items 11-18, characterized in that,
the observing condition parameters, corresponding to the observing-condition intended by the visual image and to be attached to the "image data representing the visual image", are such observing condition parameters that are employed in the CIECAM97s or the CIECAM02.

(20) An image-processing program for making a computer to realize:
a data analyzing function for acquiring an observing-condition intended by a visual image, and for analyzing "image data representing the scene luminance" based on captured image data so as to calculate an image transforming condition from analyzing result of them and the observing-condition intended by the visual image;
an image transforming function for transforming the "image data representing the scene luminance" to the "image data representing the visual image", based on the image transforming condition calculated in the data analyzing functional step; and
a formatting function for attaching observing condition parameters, corresponding to the observing-condition intended by the visual image, to the "image data representing the visual image", transformed in the image transforming functional step, so as to output the "image data representing the visual image" attached with the observing condition parameters.

(21) The image-processing program described in item 20, further making the computer to realize,
a selecting function for selecting the observing-condition intended by the visual image; and
a calculating function for calculating the observing- condition parameters corresponding to the observing-condition selected in the selecting functional step; and
in the formatting functional step, the observing condition parameters, calculated in the calculating functional step, are attached to the "image data representing the visual image", so as to output the "image data representing the visual image" attached with the observing condition parameters.

(22) The image-processing program described in item 20 or 21, characterized in that,
the image transforming condition includes a gradation mapping condition for converting a scene luminance to a luminance of the visual image.

(23) The image-processing program described in item 20 or 21, characterized in that,
the image transforming condition includes a gradation mapping condition for converting a scene luminance to a luminance of the visual image and a white-balance correction condition.

(24) The image-processing program described in item 22 or 23, characterized in that,
in the data analyzing functional step, the "image data representing the scene luminance" are analyzed by acquiring or estimating a kind of scene from the "image data representing the scene luminance".

(25) The image-processing program described in any one of items 22-24, characterized in that,
in the data analyzing functional step, a provisional gradation mapping condition under a specific observing condition are calculated, and the provisional gradation mapping condition is corrected according to the observing condition intended by the visual image, so as to calculate the gradation mapping condition.

(26) The image-processing program described in any one of items 20-25, characterized in that,
in the data analyzing functional step, the image transforming condition, in which the visual image is described in a luminance expanded color space, is calculated.

(27) The image-processing program described in any one of items 20-26, characterized in that,
in the formatting functional step, the image transforming condition, calculated in the data analyzing functional step, is attached to the "image data representing the visual image", so as to output the "image data representing the visual image" attached with the image transforming condition.

(28) The image-processing method described in any one of items 20-27, characterized in that,
the observing condition parameters, corresponding to the observing-condition intended by the visual image and to be attached to the "image data representing the visual image", are such observing condition parameters that are employed in the CIECAM97s or the CIECAM02.

From now on, the terminology employed in the claims and the descriptions of the present specification will be detailed in the following.

The term of the "image data representing the scene luminance" is defined as a kind of image data categorized in a scene-referred image state, and specifically means such image data that have substantially a linear relationship between the luminance value of recorded pixel and the scene luminance.

Further, the term of the "image data representing the visual image" is defined as image data categorized in an output-referred image state. Incidentally, the term of "image state" employed hereinafter has been firmly established in recent years as a concept of indicating the "rendering state of image data", and its detailed definition is set forth in, for instance, "Requirements for Unambiguous Specification of a Color Encoding ISO 22028-1", Kevin Spaulding, in Proc. Tenth Color Imaging Conference: Color Science and Engineering Systems, Technologies, Application IS&T, Springfield, Va., p. 106-111 (2002).

The term of "scene-referred" means a state of representing a chromaticity evaluation value for a landscape scene. For instance, such the state corresponds to a state of an image for which only calibrations of spectral sensitivity, etc. are applied to the raw data captured by the DSC (Digital Still Camera) without applying the intentional emphasizing operation. For instance, raw data employed for general purpose (namely, raw data outputted by the photosensitive element, such as the CCD (Charge Coupled Device), etc.) can be converted to the scene-referred image data by applying the matrix arithmetic calculation for correcting its spectral sensitivities of the three primary colors.

The term of "output referred" means a state of rendering the expression suitable for a specific output device or an observing condition. For instance, the JPEG (Joint Photographic Coding Experts Group) generated by the DSC for general purpose corresponds to the "output referred", since it is optimized for the displaying operation on the display device.

In the present invention, the term of "analysis of image data representing the scene luminance" means that the statistic information, such as substantial maximum value and minimum value of the luminance distribution, a luminance value having the most high emerging frequency, etc., are calculated by analyzing the histogram of the "image data representing the scene luminance". Further, it is desirable that kinds of scenes, such as a normal scene, a backlight scene and a near scene with strobe lighting, are discriminated relative to each other on the basis of the shape of the histogram. Still further, it is still more desirable that the flesh color area and/or the face shape are detected to find an average (or a median mode) luminance of that area.

In the present invention, the term of the "analyzing result" means the statistic information of the scene luminance, the kind of scene and the information of the average luminance of the flesh color area and face area, etc., which are obtained in the abovementioned procedure.

In the present invention, the term of the "observing-condition intended by the visual image" means a standard observing condition premising for creating the "image data representing the visual image". For instance, observing on a CRT, observing an image projected by a projector, observing a printed image, etc. can be cited as kinds of the observing conditions. According to the present invention, the "observing-condition intended by the visual image" can be determined, for instance, by the direct designation of the user, or by employing the standard observing condition for the image usage selected by the user. Alternatively, it is also possible to estimate the "observing-condition intended by the visual image" from the color space designated as an outputting use of the visual image data. For instance, when the sRGB color space is designated, the "observing-condition intended by the visual image" can be estimated as observing on a CRT, while, when the YMCK color space is designated, the "observing-condition intended by the visual image" can be estimated as observing a printed image. Further, when the "image data representing the visual image" are outputted to the external device, such as an image-displaying device, a printing device, etc., coupled to the image-processing apparatus embodied in the present invention, it is also possible to estimate the "observing-condition intended by the visual image" from the device information of such the devices. For instance, when the liquid-crystal projector is coupled to the image-processing apparatus, the "observing-condition intended by the visual image" can be estimated as observing a projected image in a poorly lighted room.

In the present invention, the term of the "image transforming condition" means a condition for transforming the "image data representing the scene luminance" to the "image data representing the visual image", and concretely speaking, includes the items of the white-balance correction and the gradation mapping. In the conventional technique, such the image transforming condition has been determined from the result of analyzing the "image data representing the scene luminance". While the embodiment of the present invention is characterized in that such the image transforming condition is determined by referring to both the result of analyzing the "image data representing the scene luminance" and the "observing-condition intended by the visual image". Further, in the image processing embodied in the present invention, when information, in regard to the image-capturing condition, such as, for instance, a scene type (outdoors, indoors, a portrait, a night view), presence or absence of strobe lighting, etc., and written in Exif (Exchangeable Image File Format) or the like, can be acquired, it is desirable to also refer to such the acquired information when determining the image transforming condition.

Each of the items mentioned in the above will be detailed in the following.

Conventionally, the white-balance correcting condition has been determined fundamentally on the basis of the result of analyzing the histogram for each of the RGB channels of the "image data representing the scene luminance". Further, the white-balance condition has been adjusted by detecting a flesh color, for hue changes of which the human sight is especially sensitive, so that hue of the flesh color enters in a preferable range. Although this method has been a technique for optimizing a colorimetry value (for instance, CIE L*a*b*) calculated on the premise of a white point (for instance, D65 in the case of the sRGB color space) designated in the color space expressing the "image data representing the visual image", no attention has been paid to the difference of the "observing-condition intended by the visual image". For instance, sometimes, a first image, which was appropriately appeared for the human sight when the first image, displayed on the CRT having a sufficient brightness, was closely viewed in a bright room since the CRT adaptation for the white point is high, changes to a second image, which becomes bluish for the human sight when the second image, projected on the screen with a poor brightness, is viewed in a darkish room since the adaptation of the projected image for the white point is low, even if the first and second images are categorized in the same sRGB color space. On the other hand, according to the image processing embodied in the present invention, by compensating for the white-balance correcting condition based on the "observing-condition intended by the visual image", it is possible to create an image suitable for the "observing-condition intended by the visual image".

Next, the gradation mapping will be detailed in the following. Generally speaking, due to a considerable amount of the lighting unevenness, the luminance ratio of the photographed scene frequently exceeds 1000 times (refer to, for instance, "Color Science Handbook second edition", edited by the Color Science Association of Japan, published by Tokyo University publishing association, p 925-926, (1998)). On the other hand, the displayable luminance ratio (luminance dynamic range) of various kinds of displaying media is in an order of 100 times. Inevitably, a gradation for expressing the "image data representing the visual image" is different from that for expressing the "image data representing the scene luminance". Accordingly, the conversion process for converting the gradation of the "image data representing the scene luminance" to that of "image data representing the visual image" is called a gradation mapping. Although the abovementioned conversion process could be divided into two processes of the exposure correction, for selecting a luminance area to be mapped at a center luminance of the visual image from a wide variety of the scene luminance, and the gradation correction for selecting a relationship between the scene luminance and the luminance of the visual image to be employed for mapping, hereinafter, it is called the gradation mapping as a whole, since there has been practically an algorism for conducting the both the exposure correction and the gradation correction at the same time.

Instead of keeping the gradation mapping condition at uniform, it is necessary to change it according to the state of the scene to be captured. For instance, when 70% of the scene is bright while the rest of the scene is dark, in the normal situation, the gradation mapping should be conducted so as to make the bright part of the scene or the average luminance of the whole scene clear for viewing. However, if the dark area is located at the center of the scene and a human portrait resides on the dark area, the scene should be determined as a backlight scene and the gradation mapping should be changed so as to make the human portrait residing on the dark area clear for viewing. Further, as for a group photograph in which relatively small faces are photographed, the slightly hard tone image would be preferable, while, as for a close-up of a human face such as a portrait, the slightly soft tone image would be preferable. Accordingly, there has been employed a method of determining the gradation mapping condition, based on results of analyzing statistic information of the scene luminance, a kind of the scene and the average luminance of the flesh color area and the face area. Concretely speaking, there has been well-known the method set forth in, for instance, Tokugan 2003-434669 (Japanese Patent Application). Such the conventional technique has been a technique for optimizing the luminance gradation of the colorimetry value (for instance, CIE L*a*b*) calculated by premising the reproduction gamma (for instance, 2.2 in the case of the sRGB) designated in the color space expressing the "image data representing the visual image". On the other hand, the present invention is characterized in that the gradation mapping condition is changed while taking the intended observing condition into account. For instance, when viewing an image having the same luminance in a bright room and a poor lighted room, since the image would be viewed as a bright and soft tone image when viewed in the poor lighted room, it is desirable that the gradation mapping condition is adjusted at a slightly darker and softer tone than the standard gradation mapping condition when the surround environment, is dim with respect to the "observing-condition intended by the visual image". As mentioned in the above, according to the present invention, the gradation mapping condition is adjusted so as to match it with the "observing-condition intended by the visual image".

In the present invention, the "observing condition parameters corresponding to the observing-condition intended by the visual image" are concrete input values to be employed for the calculation of the color appearance model, being estimated under the "observing-condition intended by the visual image". The luminance in the adapting field, the tristimulus values of adapting white, the relative luminance of the background, the impact of surround, etc. can be cited as the observing condition parameters. Although it would be possible for the user to directly designate the concrete input values of the observing condition parameters, it is quite difficult in most all the cases for the user, other than the expert on this field, to establish such the concrete input values of the observing condition parameters. Accordingly, it is desirable that, by using a table indicating correlations of kinds of the observing conditions and the observing condition parameters and prepared in advance, the concrete observing condition parameters are established corresponding to the kind of the observing condition designated by the user. Further, it is desirable that, based on the result of analyzing the "image data representing the visual image", the observing condition parameters prepared in advance are corrected as needed. Although, for instance, about 20% of the luminance of adapting white is normally employed as the relative luminance of the background, when the background of the whole image is considerably darker than the abovementioned value as in, for instance, an image of a night scene or a firework, the relative luminance value of the background is set at a darker value.

Such the observing condition parameters corresponding to the "observing-condition intended by the visual image" are attached to the "image data representing the visual image" either by storing them in a file of the image data as meta information (or tag information) or by storing them in another file correlating to the file of the image data, so as to output them.

As described in the above, the "image data representing the visual image", created according to the image processing operation embodied in the present invention, are transformed so as to conform to the "observing-condition intended by the visual image" and are attached with the observing condition parameters corresponding to the "observing-condition intended by the visual image". Therefore, it becomes possible for the image displaying apparatus, the printer or the other image-processing apparatus, which receives the "image data representing the visual image", created according to the image processing operation embodied in the present invention, to attain an appropriate "color appearance" of the reproduced image by employing the color appearance model.

Further, it is preferable that the luminance expansion color space is employed for both the color space used for the arithmetic calculation of the image processing and that for outputting the visual image. Now, the luminance expansion color space will be detailed. The sRGB color space universally employed for the image captured by the DSC at present is defined as the specification of IEC61966-2-1 specified by the IEC (International Electro-technical Commission). For instance, in the case of 8 bits, the black point and the white point are specified at zero, being a minimum value of 8 bits gradation, and at 255, being a maximum value of 8 bits gradation, respectively, and the gamma value when displaying or printing is specified at 2.2. In this connection, there arises a problem what the white point designates. Although there would be three cases under consideration as the white point, (i) a white ground of displaying/printing media, (ii) a white ground of a perfect diffusion reflecting plate in the photographed scene, (iii) a maximum luminance value in the photographed scene (including a mirror reflection and a light emitting part), the displaying devices, the printers and the application software for imaging, which are presently available in the market, are so constituted that they work by regarding item (i) as the white point.

When the raw image data captured by the DSC are transformed to the output-referred image data, the white point is allotted to the scene luminance to be displayed as white in the displaying/printing operation. In this case, since the photographed luminance value of the area of item (ii) or item (iii) tends to be higher than that of the white point and it is impossible to record such a pixel value that is higher than the white point, such the area would be painted over with white. Since the exposure control of the DSC is not almighty, however, it would be necessary to adjust the image later on. For instance, a case in which a "white dropout" (a halation) caused by a light reflection on the forehead or the nose, is generated in the face area could be cited. However, since the area in the image recorded by employing the sRGB color space is clipped at white (in the case of 8 bits: 255), and therefore, the photographed information of that area are already lost, it is impossible to correct such the situation. To avoid the above-mentioned problem, it would be possible to record the image data with item (iii) set at the white point. However, since the displaying devices, the printers and the application software for imaging regard item (i) as the white point, such the image would be displayed or printed in a darkish and soft tone, which is not suitable as the visual image.

On the other hand, there has been proposed various kinds of color spaces that enable a recoding operation of a luminance value exceeding the white point. For instance, an scRGB, an scRGB-nl and an scYCC-nl, which are specified by the IEC61966-2-2, and a RIMM RGB and an ERIMM RGB, which are specified by the ANSI/13A IT10.7466, can be cited as such the examples. In the present specification, the above-mentioned color spaces are totally called the "luminance expansion color space". Exemplifying the scRGB color space of 16 bits, the "luminance expansion color space" will be detailed in the following.

When the values, derived by normalizing the colorimetry values in the CIE 1931 XYZ space with the black point at 0 and the white point at 1, are established as X, Y, Z, the R, G, B values of the scRGB are defined by equations (1) and (2) shown as follow. Herein, the R, G, B values are expressed in the floating point without quantizing them into integers.

$$\begin{bmatrix} R' \\ G' \\ B' \end{bmatrix} = \begin{bmatrix} 3.240625 & -1.537208 & -0.498629 \\ -0.968931 & 1.875756 & 0.041518 \\ 0.055710 & -0.204021 & 1.056996 \end{bmatrix} * \begin{bmatrix} X \\ Y \\ Z \end{bmatrix} \quad (1)$$

$$\begin{bmatrix} R \\ G \\ B \end{bmatrix} = \begin{bmatrix} \text{round}\{(R'o \times 8192.0) + 4096\} \\ \text{round}\{(G'o \times 8192.0) + 4096\} \\ \text{round}\{(B'o \times 8192.0) + 4096\} \end{bmatrix} \quad (2)$$

Conversely, it is also possible to transform the R, G, B values of the scRGB to the X, Y, Z, values by employing equations (3) and (4) shown as follow.

$$\begin{pmatrix} R' \\ G' \\ B' \end{pmatrix} = \begin{pmatrix} (R \div 8192.0) - 0.5 \\ (G \div 8192.0) - 0.5 \\ (B \div 8192.0) - 0.5 \end{pmatrix} \quad (3)$$

$$\begin{pmatrix} X \\ Y \\ Z \end{pmatrix} = \begin{pmatrix} 0.4124 & 0.3576 & 0.1805 \\ 0.2126 & 0.7152 & 0.0722 \\ 0.0193 & 0.1192 & 0.9505 \end{pmatrix} \begin{pmatrix} R' \\ G' \\ B' \end{pmatrix} \quad (4)$$

According to the definition mentioned in the above, the values (R', G', B') of the black point are (0, 0, 0), and the values (R, G, B) of its 16-bits expression are (4096, 4096, 4096). Further, the values (R', G', B') at D65 of the white point are (1, 1, 1), and the values (R, G, B) of its 16-bits expression are (12288, 12288, 12288). In the 16-bits expression, a value in a range of 0-4095 corresponds to a luminance equal to or lower than that of the black point, a value in a range of 4096-12288 corresponds to a luminance equal to or higher than that of the black point and equal to or lower than that of the white point, and a value in a range of 12289-65535 corresponds to a luminance exceeding the white point. Accordingly, it is possible to express the luminance range of −0.5-+7.4999 when normalizing it with the black point at 0 and the white point at 1.

By employing the luminance expansion color space for both the color space used for the arithmetic calculation of the image processing operation embodied in the present invention and that for outputting the "image data representing the visual image", it becomes possible to record image data of a specific area, the scene luminance of which is higher than that of an area to be displayed in the visual image, as a luminance higher than the white point without clipping the white point. According to the above, when a separate displaying/printing device receives the "image data representing the visual image" created by the image processing operation embodied in the present invention to transform them to image data corresponding to an observing-condition being different from the observing-condition intended by the visual image, it is possible to prevent the output image from lacking detail and/or occurring pseudo-contour.

Further, it is applicable that the luminance expansion color space is employed for the color space used for outputting the "image data representing the visual image" in the present invention, and further, the image transforming condition, implemented in the image-processing operation embodied in the present invention, is attached to the "image data representing the visual image" to be outputted. According to this operation, when a separate color appearance model, which has no compatibility with the color appearance model used for creating the "image data representing the visual image", is wished to employ, it becomes possible to conduct a new image transforming operation again on the basis of the separate color appearance model by inverse-transforming the "image data representing the visual image" to the "image data representing the scene luminance".

Incidentally, equation (2) indicates a transformation for expressing the color space with 16-bits integers having no sign. However, when the image-processing apparatus has a capability of processing flouting point values at a high velocity, it is applicable that the flouting point values (R', G', B') defined by equation (1) are handled in the internal arithmetic calculations. Since the values (R', G', B') has a proportional relationship with the luminance, the arithmetic calculating equation for the image-processing operation can be simplified, and it would be a preferable embodiment as the arithmetic calculation for the image-processing operation embodied in the present invention when the flouting point processing is allowed.

Incidentally, since the scRGB stores integers having a linear relationship with the luminance, its data size stored in a file would be getting large. Accordingly, when the image data are stored in the file or sent to another image-processing apparatus, another image-displaying apparatus or another printer, it is applicable that the image data are transformed to those in the luminance expansion color space, in which the data size is smaller than that in the scRGB. As for such the color space, the scRGB-nl and the scYCC-nl, which are specified by the IEC61966-2-2 Annex B, and the RIMM RGB, which is specified by the ANSI/13A IT10.7466, can be cited. Conversely, when the data size is out of considerations, it would be applicable that, instead of the integers in the scRGB, the image data expressed by the flouting point values are stored in the file or sent to another image-processing apparatus, another image-displaying apparatus or another printer. As mentioned in the above, it is possible to arbitrarily determine whether or not the luminance expansion color space should be selected concretely, based on the specifications of the apparatus implementing the present invention.

According to the present invention, the following effects can be attained.

(1) Since the image transforming condition is calculated from the result of analyzing the "image data representing the scene luminance" based on the captured image data and the "observing condition intended by the visual image", and the "image data representing the scene luminance" are transformed to the "image data representing the visual image" on the basis of the image transforming condition calculated in the above step, and the "observing condition parameters corresponding to the observing-condition intended by the visual image" are attached to the "image data representing the visual image" transformed in the above step so as to output the "image data representing the visual image" attached with the observing condition parameters, it becomes possible to easily generate the "image data representing the visual image" being applicable for a color appearance model from captured image data outputted by the digital camera, etc., without conducting specific measurements at the time of the image-capturing operation and without requiring special technical knowledge.

(2) Since the "observing condition parameters corresponding to the observing-condition intended by the visual image" are attached to the "image data representing the visual image" to be outputted, by outputting the "image data representing the visual image" to such apparatuses as various kinds of image-displaying apparatus, a printer, an image-processing apparatus, which conform to a color appearance model, it becomes possible to appropriately reproduce the "color appearance" intended at the time of creating the visual image, even under the observing condition being different from that intended at the time of creating the visual image.

Referring to the drawings, the embodiment of the present invention will be detailed in the following. Initially, referring to FIGS. 1-4, the configuration of the apparatus embodied in the present invention will be detailed in the following.

FIG. 1 shows a schematic diagram of a configuration of image-processing system 1α embodied in the present invention. The image-processing system 1α is provided with: image-processing apparatus 100; monitor 41; operating section 42; digital camera 43; CD/DVD (Digital Versatile Disc) drive 44; network line 45, such as LAN (Local Area Network), etc.; printer 46; and projector 47. The image-processing apparatus 100 is constituted by: controlling section 10; storage section 20; and input/output interface 30.

The monitor 41, operating section 42, digital camera 43, CD/DVD drive 44 and network line 45 are coupled to input/output interface 30. The controlling section 10 includes: CPU (Central Processing Unit) 11 for controlling sections as a whole; memory 12 including RAM (Random Access Memory and ROM (Read Only Memory); etc.

The image-processing system 1α is provided with a personal computer, monitor 41 and operating section 42 from which the user can input various kinds of optional items. Since CPU 11 of controlling section 10 reads application program 21 stored in storage section 20 into memory 12 so as to execute application program 21, the personal computer, etc. can be functioned as a part of image-processing apparatus 100. Further, since image-processing apparatus 100 is connectable to digital camera 43, CD/DVD drive 44 and network line 45 through input/output interface 30, it is possible for image-processing apparatus 100 to input the image data and to output the "image data representing the visual image" from/to these devices/line. Still further, an image displaying apparatus and an image printing apparatus, such as printer 46, projector 47, etc., can be coupled to the personal computer. When the "image data representing the visual image" are outputted to such the apparatus, the "image data representing the visual image" are outputted into the driver software of the image displaying apparatus and the image printing apparatus (not shown in the drawings) from application program 21.

Figure 2:
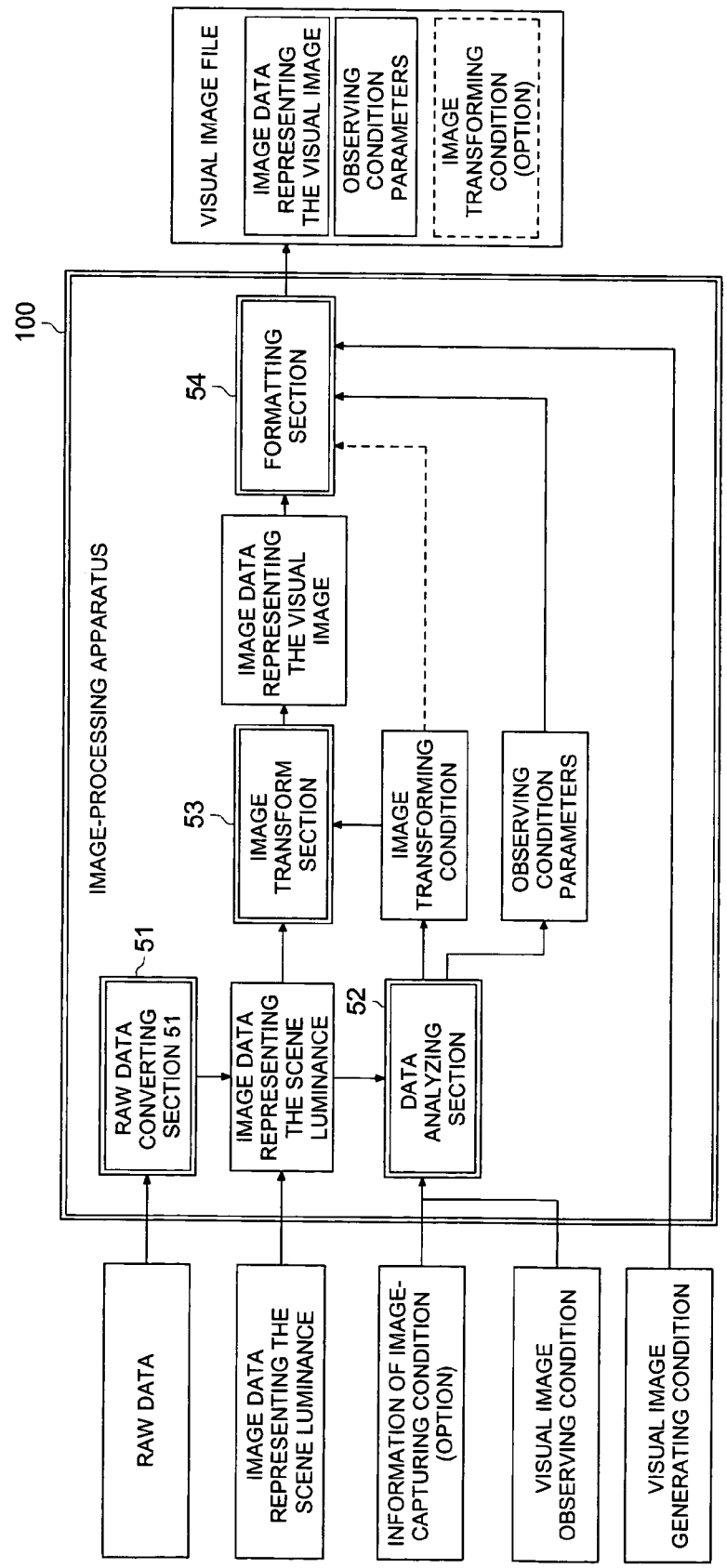
FIG. 2 shows a schematic diagram of a configuration of image-processing apparatus 100, indicating each of the application functions.

FIG. 2 shows a schematic diagram of a configuration of image-processing apparatus 100, indicating each of the application functions. Referring to the functions of the personal computer mentioned in the above, the image-processing apparatus 100 is constituted by: raw data converting section 51; data analyzing section 52; image transform section 53; and formatting section 54. When an operator inputs a raw data inputting command, the raw data is sent to raw data converting section 51 in which the raw data is converted to "image data representing the scene luminance" by applying well-known arithmetic calculations, such as, a matrix calculation for calibrating a spectral sensitivity of a sensor, an automatic white balance calculation and an automatic exposure correction calculation, and the converted "image data representing the scene luminance" is sent to data analyzing section 52. Further, when an operator inputs a command for inputting the "image data representing the scene luminance", the "image data representing the scene luminance" are directly sent to data analyzing section 52.

Still further, when information in regards to the image-capturing conditions of the inputted image data (such as a shutter speed, an aperture, a scene type, a presence or absence of strobe lighting, etc., and hereinafter, also referred to as photographing condition information) are stored in the file of the inputted image data as metadata, or are obtainable from another file stored correlating with the inputted image data, such the information in regard to the image-capturing conditions are also sent to data analyzing section 52.

FIG. 3 shows dialogue window DI for selecting one of visual image observing conditions. When an operator inputs a command for inputting the image data, monitor 41 displays dialogue window DI for selecting a visual image observing condition, so that the operator can selects one of visual image observing conditions in dialogue window DI through operating section 42, and information in regard to the visual image observing condition selected by the operator are sent to data analyzing section 52.

Figure 4:
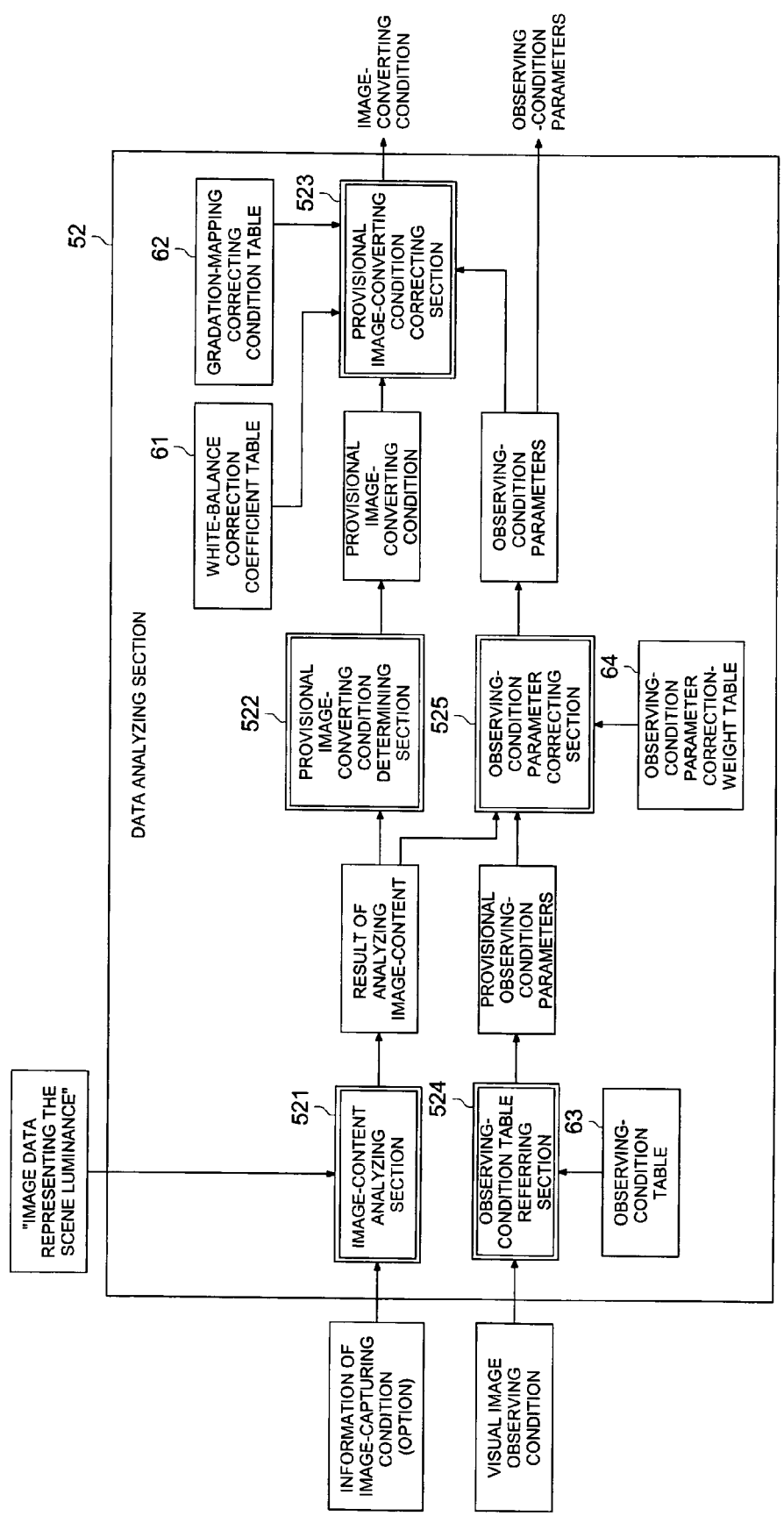
FIG. 4 shows an internal configuration of data analyzing section 52 and a flow of the calculating operation performed in it.

Next, the internal configuration and the calculating operation of data analyzing section 52 included in image-processing apparatus 100 will be detailed in the following. FIG. 4 shows the internal configuration of data analyzing section 52 and a flow of the calculating operation performed in it. The data analyzing section 52 is constituted by: image-content analyzing section 521; provisional image-converting condition determining section 522; provisional image-converting condition correcting section 523; observing-condition table referring section 524; and observing-condition parameter correcting section 525. Further, data analyzing section 52 also includes: white-balance correction coefficient table 61; gradation-mapping correcting condition table 62; observing-condition table 63; and observing-condition parameter correction-weight table 64; which are to be stored in storage section 20.

Figure 5:
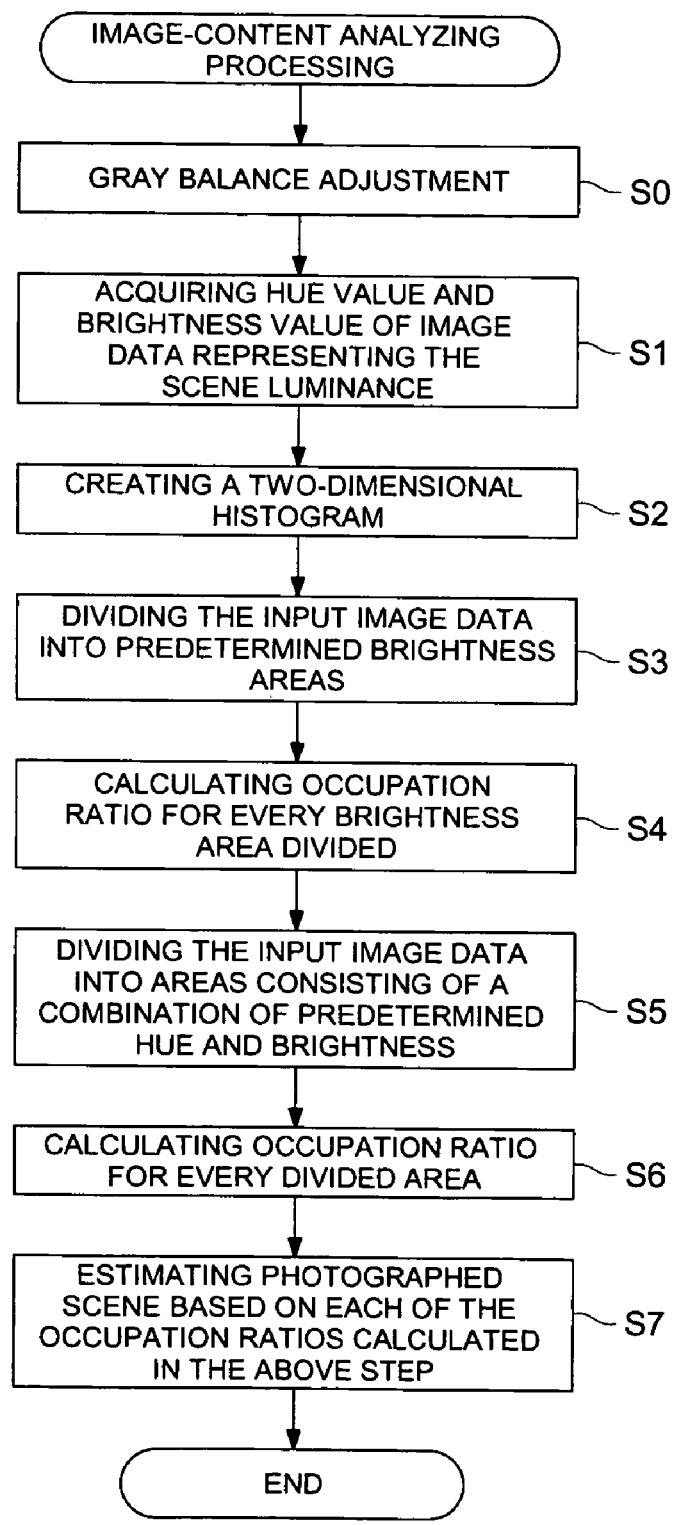
FIG. 5 shows a flowchart of an image-content analysis processing performed by image-content analyzing section 521.

The "image data representing the scene luminance" are sent to image-content analyzing section 521. FIG. 5 shows a flowchart of an image-content analysis processing performed by image-content analyzing section 521. Now, referring to FIG. 5, the image-content analysis processing performed by image-content analyzing section 521 will be detailed in the following.

At first, the gray balance adjustment processing is applied to the "image data representing the scene luminance" (step S0), so as to correctly conduct the conversion processing to be performed in next step 1. Then, the RGB values of the "image data representing the scene luminance" adjusted by the gray balance adjustment processing are converted to the values of the HSV color specification system (step S1). In HSV color specification system, which was devised on the basis of the color specification system proposed by Munsell, a color is represented by three elemental attributes, namely, hue, saturation and brightness (or value). A concrete example of the conversion method is set forth in, for instance, "Visual Basic 5.0 Technical Library" written by John Clark Craig and Jeff Webb.

Figure 6:
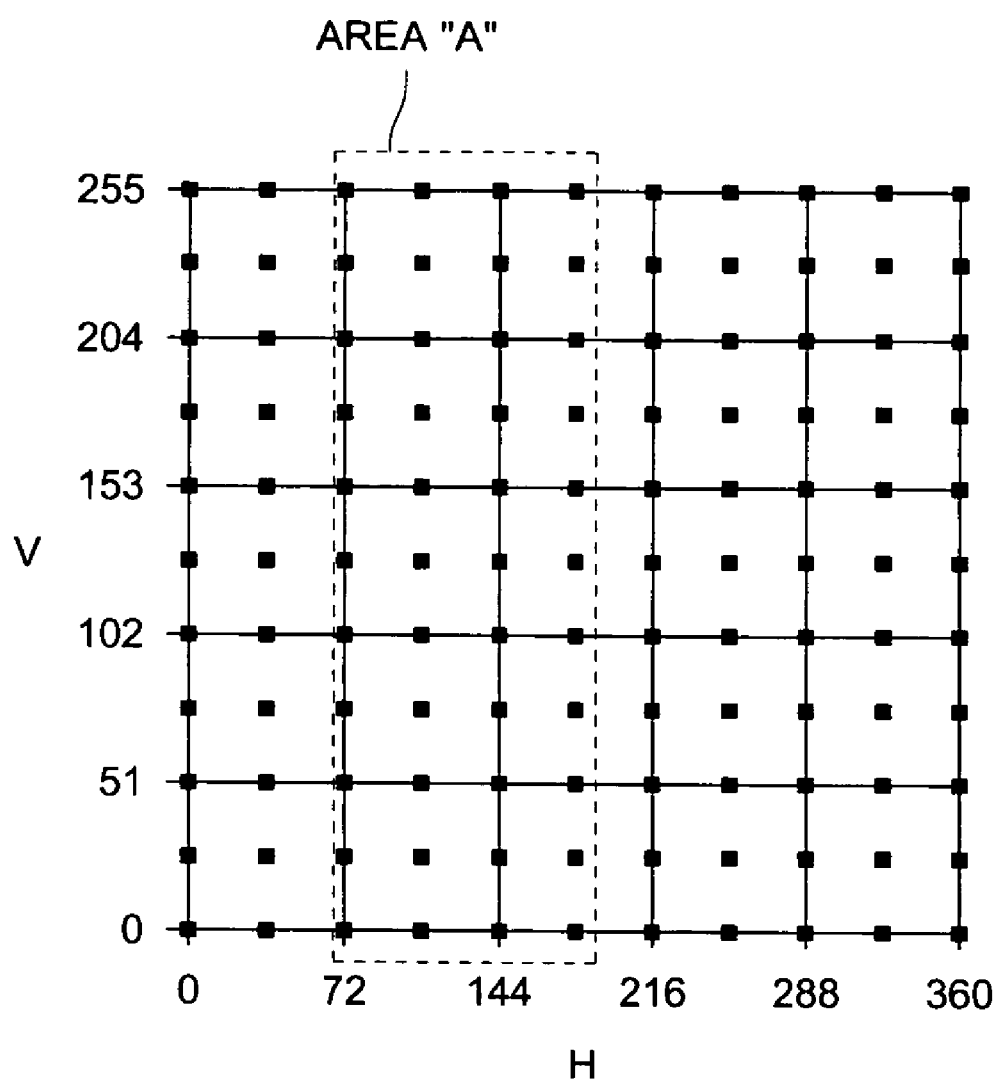
FIG. 6 shows an example of the two-dimensional histogram.

When the hue value and the brightness value of every pixel included in the "image data representing the scene luminance" are acquired in step S1, a two-dimensional histogram, which indicates a cumulative frequency distribution of the pixels, is created in the coordinate plane having an x-axis as the hue value (H) and a y-axis as the brightness value (V) (step S2). FIG. 6 shows an example of the two-dimensional histogram. In the two-dimensional histogram shown in FIG. 6, lattice points indicating values of the cumulative frequency distribution of the pixels are plotted in the coordinate plane having the x-axis as the hue value (H) and the y-axis as the brightness value (V). The lattice points located at the edge of the coordinate plane retain cumulative frequency of pixels distributing in such a range that the hue value (H) is 18, while the brightness value (V) is about 13. The other lattice points retain cumulative frequency of pixels distributing in such a range that the hue value (H) is 36, while the brightness value (V) is about 25. Area "A" indicates a green hue area having a hue value (H) in a range of 70-184 and a brightness value (V) in a range of 0-255. Incidentally, in this case, the brightness value (V) may be any arbitrary value.

Successively, the "image data representing the scene luminance" are divided into the predetermined brightness areas, based on the two-dimensional histogram created in step S2 (step S3). Concretely speaking, by dividing the created two-dimensional histogram into at least two planes with a border of at least one brightness value defined in advance, the "image data representing the scene luminance" are divided into the predetermined brightness areas. In the present invention, it is desirable that the "image data representing the scene luminance" are divided into three brightness areas by employing at least two brightness values. Further, it is also desirable that the brightness values for the border are established at 85 and 170 as values calculated by the aforementioned HSV conversion program. In the present embodiment, the two-dimensional histogram (namely, the "image data representing the scene luminance") is divided into three brightness areas by employing two brightness values of 85 and 170. According to this operation, it becomes possible to divide the two-dimensional histogram (namely, the "image data representing the scene luminance") into a shadow area (brightness value: 0-84), an intermediate area (brightness value: 85-169) and a highlighted area (brightness value: 170-255).

When the "image data representing the scene luminance" are divided into the predetermined brightness areas in step S3, by dividing each of the sigma values of cumulative frequency distributions of the divided brightness areas by the total number of pixels included in the inputted image data with respect to each of the three brightness areas divided in the above, a ratio of each of the divided brightness areas and the total image area represented by the inputted image data, namely, an occupation ratio for every brightness area is calculated (step S4).

Successively, based on the two-dimensional histogram created in the above, the "image data representing the scene luminance" are divided into areas having combinations of predetermined hue and brightness (step S5). Concretely speaking, by dividing the created two-dimensional histogram into at least four planes with borders of at least one hue value and one brightness value defined in advance, the "image data representing the scene luminance" are divided into the areas having combinations of predetermined hue and brightness. In the present invention, it is desirable that the "image data representing the scene luminance" are divided into six areas by employing at least one hue value and two brightness values. Further, it is also desirable that the hue value for the borders is established at 70 as a value calculated by the aforementioned HSV conversion program. Still further, it is also desirable that the brightness values for the borders are established at 85 and 170 as values calculated by the aforementioned HSV conversion program. According to this operation, it becomes possible to divide the two-dimensional histogram (namely, the "image data representing the scene luminance") into at least three areas of a flesh-color shadow area (hue value: 0-69, brightness value: 0-84), a flesh-color intermediate area (hue value: 0-69, brightness value: 85-169) and a flesh-color highlighted area (hue value: 0-69, brightness value: 170-255).

When the "image data representing the scene luminance" are divided into the areas having combinations of predetermined hue and brightness, by dividing each of the sigma values of cumulative frequency distributions of the divided areas by the total number of pixels included in the inputted image data, a ratio of each of the divided areas and the total image area represented by the "image data representing the scene luminance", namely, an occupation ratio for every area is calculated (step S6).

Successively, based on the occupation ratio found in step S4 and S6, a photographed scene represented by the "image data representing the scene luminance" is estimated (step S7). Concretely speaking, it is estimated whether the photographed scene was captured under the backlight condition or the strobe lighting condition, based on occupation ratios of shadow, intermediate and highlighted areas, and those of flesh-color shadow, flesh-color intermediate and flesh-color highlighted areas, and then, the photographed scene estimation processing "A" is finalized. As an estimation method, for instance, it is possible to estimate the photographed scene on the basis of a definition table stored in ROM, etc. As shown in <Definition 1>, the definition table includes definitions for correlated relationships between the photographed scene, and first magnitude relationships of the occupation ratios of shadow, intermediate and highlighted areas, and second magnitude relationships of the occupation ratios of flesh-color shadow, flesh-color intermediate and flesh-color highlighted areas.

<Definition 1>

Occupation ratio of shadow area: Rs
Occupation ratio of intermediate area: Rm
Occupation ratio of highlighted area: Rh
Occupation ratio of flesh-color shadow area: SkRs
Occupation ratio of flesh-color intermediate area: SkRm
Occupation ratio of flesh-color highlighted area: SkRh
Scene under backlight: Rs>Rm, Rh>Rm, SkRs>SkRm>SkRh
Scene under strobe lighting: Rh>Rs, Rh>Rm, SkRh>SkRm>SkRs Incidentally, when the photographing condition information, including such information that photographed scene was captured under the backlight condition or the strobe lighting condition, are inputted into image-content analyzing section 521, the photographic scene estimated result is determined only by employing the photographing condition information without conducting the image-content analysis processing mentioned in the above. The various kinds of statistics information and the scene estimated result, derived from the image-content analysis processing described in the above, are sent to provisional image-converting condition determining section 522 and observing-condition parameter correcting section 525 from image-content analyzing section 521 as an image-content analysis result.

In the provisional image-converting condition determining section 522, the provisional image-converting condition is calculated on a premise of specific observing condition parameters determined in advance. Further, in the provisional image-converting condition correcting section 523, the provisional image-converting condition is corrected so as to generate the image converting condition corresponding to the observing condition parameters designated by the provisional image-converting condition correcting section 523. It would not be indispensable to calculate the image converting condition through the abovementioned two steps. In such the case, however, that the image converting condition is calculated through the abovementioned two steps by employing a condition equivalent for viewing the CRT screen in the room as the specific observing condition parameters determined in advance, it becomes possible to easily configure image-processing apparatus 100, since the conventional algorism premising an sRGB optimization can be employed for the calculations to be performed in the provisional image-converting condition determining section 522.

Next, as an example of the calculation to be performed in the provisional image-converting condition determining section 522, the gradation conversion processing will be detailed in the following. The scope of the calculation method to be employed in the provisional image-converting condition determining section 522 is not limited to the gradation conversion processing detailed in the following, but the conventional algorism premising an sRGB optimization could be also employed as aforementioned.

Incidentally, an average brightness value of the overall image area is generally employed as an index for determining a target value after the gradation conversion processing, which is required at the time of conducting the gradation conversion processing. In the scene captured under backlight condition, the scene captured under strobe lighting condition, etc., however, bright and dark areas are mingled with each other, and the brightness of the face area, serving as an important subject in the image, deviates toward either the bright area or the dark area. Accordingly, in regard to the gradation conversion processing for the scene captured under backlight condition or the scene captured under strobe lighting condition, it would be an ideal practice to adjust the brightness of the face area so as to correct it to an appropriate value by employing an average brightness value of the face area rather than employing the average brightness value of the overall image area. In real photographing operations, since differences between bright and dark areas would variably differ from each other, it is desirable to adjust a weighted ratio of the brightness of the face area (hereinafter, referred to as a face-area contribution ratio).

Figure 7:
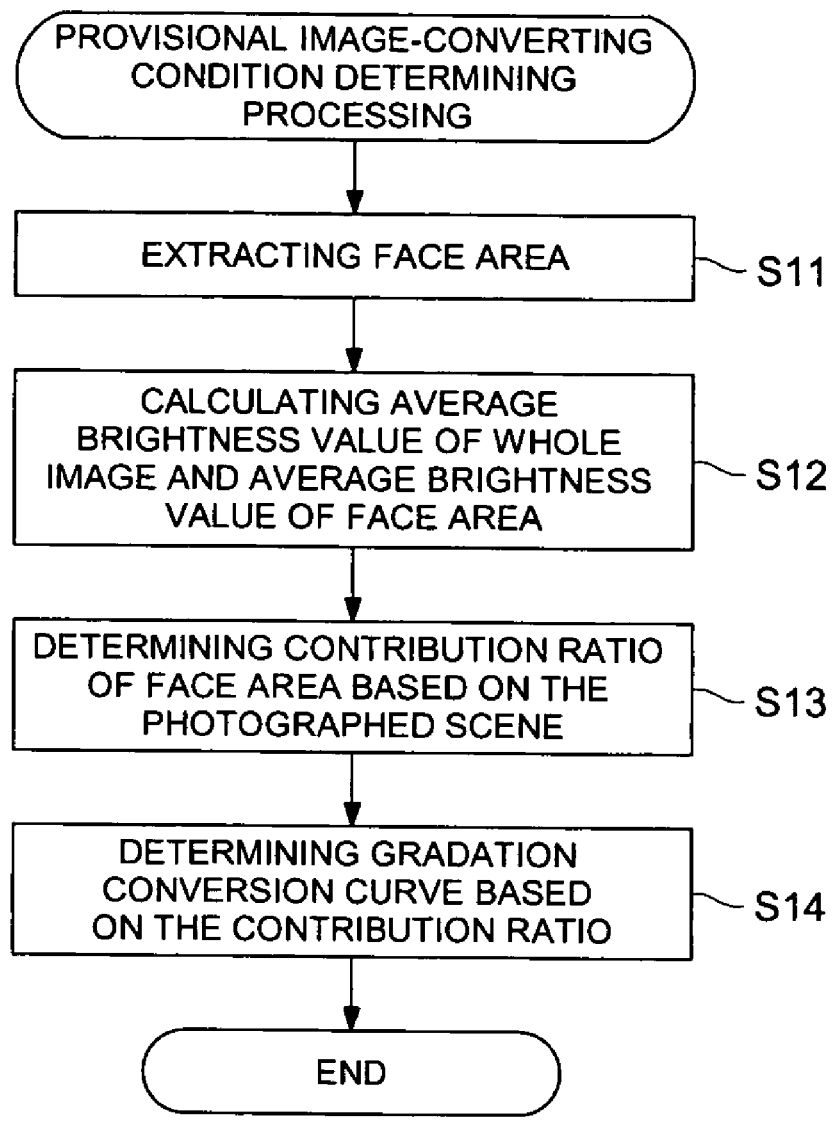
FIG. 7 shows a flowchart of a provisional image-converting condition determining processing performed by provisional image-converting condition determining section 522.

Accordingly, in the present embodiment, the provisional image-converting condition is determined by using a result of the photographed scene estimation processing and by taking a degree of difference between the face area and the overall image area into account. FIG. 7 shows a flowchart of the provisional image-converting condition determining processing performed by the provisional image-converting condition determining section 522.

Initially, the face area is extracted from the "image data representing the scene luminance" (step S11). Although there have been well-known various kinds of methods for extracting the face area, it is desirable in the present invention to create the two-dimensional histogram having the x-axis as the hue value (H) and the y-axis as the brightness value (V) so as to extract the pixels, distributed in the flesh-color area constituted by combinations of predetermined hue and brightness values, as the face area. It is also desirable that, when employing the two-dimensional histogram, the hue values calculated by the HSV conversion program are in a range of 0-50, while the brightness values calculated by the HSV conversion program are in a range of 10-120.

Incidentally, it is desirable that, in addition to the abovementioned method for extracting the flesh-color area, another image processing for extracting the face area is separately applied to the inputted image data in order to improve the accuracy of the extracting operation. Anyone of the processing methods applicable as public knowledge could be employed for the image processing for extracting the face area. The "simple area expansion method" can be cited as an example of the processing methods applicable as public knowledge mentioned in the above. According to the "simple area expanding method", when a specific pixel (a flesh-color pixel), which falls under the definition of flesh-color, is discretely extracted, differences between the flesh-color pixel and the pixels located in the vicinity of it are found. Then, when the differences found in the above is smaller than a predetermined threshold value, the area including the flesh-color pixel is determined as the face area, and then, by gradually expanding the face area according to the abovementioned procedure, the whole face area can be extracted. Alternatively, it is also possible to extract the face area from the flesh-color area by using a learning function executed by a neural network.

When the extraction of the face area is completed in step S11, the average brightness value of the extracted face area and that of the overall image area are calculated (step S12). Further, the face-area contribution ratio is determined on the basis of the photographed scene estimated by the image-content analysis processing performed in image-content analyzing section 521 (step S13). Based on the empirical rule, the face-area contribution ratios, corresponding to various kinds of the photographed scenes, are established in advance, for instance, as shown in the following <Definition 2>. Since the relationships between the photographed scenes and the face-area contribution ratios are established as a table stored in ROM, etc., the face-area contribution ratio based on the photographed scene is determined by referring to this table.

<Definition 2>
Scene under backlight condition=100 (%)
Scene under half-backlight condition 50 (%)
Scene under strobe lighting condition=100 (%)
Normal scene=30 (%)

With respect to the scene captured under the backlight condition, it is desirable to adjust the face-area contribution ratio, corresponding to the average brightness value of the face area or a brightness deviation amount for the overall image area, detailed later. In the abovementioned example, by setting the threshold level for the average brightness value of the face area, the degree of the scene captured under the backlight condition is divided into two steps as a result of determining whether or not the average brightness value exceeds the threshold level. However, it is also applicable that the degree of the scene captured under the backlight condition is divided into more finely divided steps.

Successively, the "black color saturation point" and the "white color saturation point", each serving as a limit index of the brightness area, and a "kind of the gradation conversion curve" to be applied to the inputted image data are determined on the basis of the face-area contribution ratio determined by the foregoing procedure (step S14). Then, the provisional image-converting condition determining processing is finalized.

The determining method of the "average brightness value" will be described as follow.

The average brightness input value (C) is calculated by employing equation 5 shown as follow.

$$C = a \times (1-(Rsk \times 0.01)) + (b \times Rsk \times 0.01) \quad (5)$$

where a: average brightness value of overall image area
b: average brightness value of face area
c: average brightness input value
Rsk: face-area contribution ratio.

Figure 8:
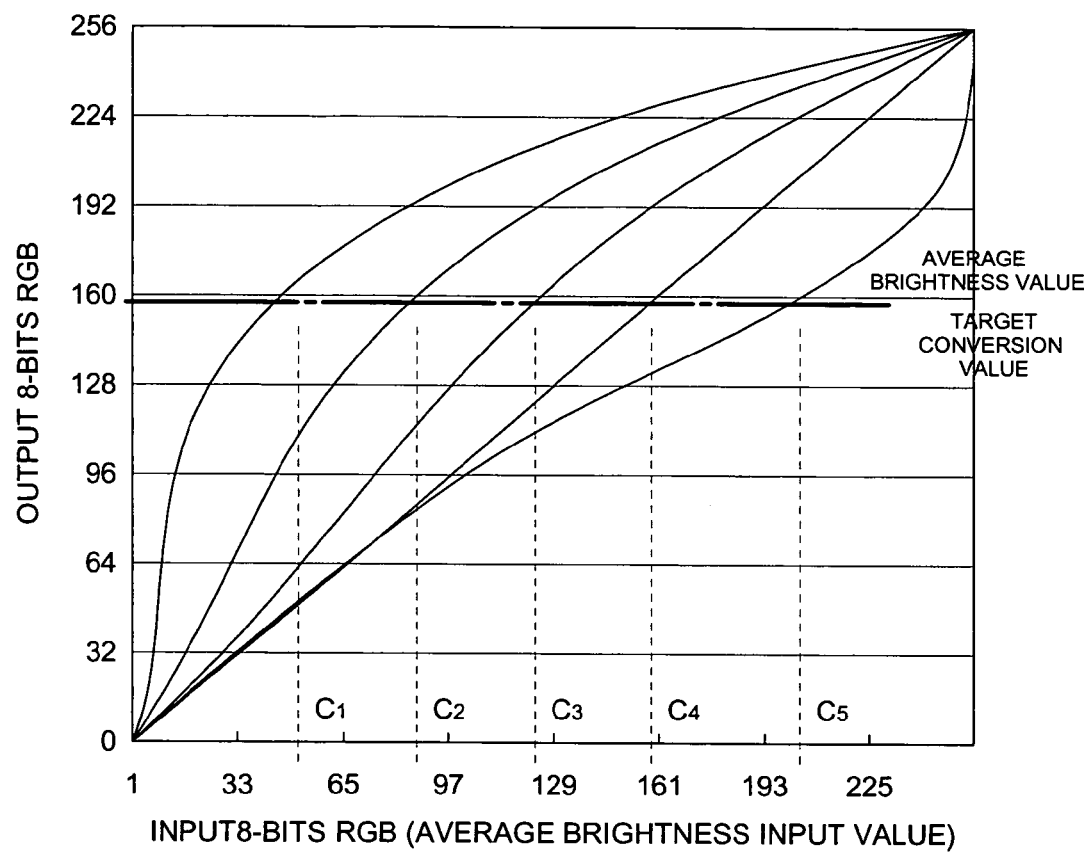
FIG. 8 shows gradation conversion curves.

FIG. 8 shows gradation conversion curves.

Successively, as shown in FIG. 8, each of the gradation conversion curves is determined so as to convert the average brightness input value to the conversion target value of the average brightness value determined in advance. In FIG. 8, as for the scene captured under the backlight condition, the average brightness input values become C1 and C2, and the gradation conversion curves are determined so as to make the output values much bright. As for the normal scene, the average brightness input value becomes C3, and the gradation conversion curve is determined so as to make the output value slightly bright. As for the scene captured under the strobe lighting condition, the average brightness input values become C4 and C5, and the gradation conversion curves are determined so as to make the output values equivalent to or slightly lower than the input values.

It is possible to determine the gradation conversion curve by changing the old gradation conversion curve to new one created on the basis of the average brightness input values calculated by the foregoing procedure, every time when new image data are inputted. Alternatively, it is also possible to determine the gradation conversion curve by selecting a suitable one out of a plurality of gradation conversion curves, prepared in advance, corresponding to the average brightness input values. Further, it is also applicable to provide a plurality of gradation conversion curves shown in FIG. 8 in advance, so as to employ one of them according to information of a photographing mode, such as a meeting photograph, a portrait, etc.

Next, the calculating contents performed in the provisional image-converting condition correcting section 523 will be detailed in the following. The storage section 20 of image-processing apparatus 100 stores: white-balance correction coefficient table 61 that describes relationships between the observing conditions designated and the white-balance correction coefficients of the visual image; and gradation-mapping correcting condition table 62 that describes relationships between the observing conditions designated and the gradation-mapping correcting conditions. While, referring to the white-balance correction coefficient table 61 and the gradation-mapping correcting condition table 62, the provisional image-converting condition correcting section 523 correct the provisional image-converting condition and calculated the image-converting condition.

An example of the white-balance correction coefficient table 61 is indicated in the following.

TABLE 1

| OBSERVING CONDITION | WHITE BALANCE CORRECTION COEFFICIENTS | | |
|---|---|---|---|
| | kR | kG | kB |
| CRT DISPLAY (OFFICE) | 1 | 1 | 1 |
| CRT DISPLAY (HOME) | 1.018 | 0.9976 | 0.9720 |
| PROJECTED BY PROJECTOR (DARK ROOM) | 1.035 | 0.9952 | 0.9441 |
| ... | | | |
| POSTER | 1 | 1 | 1 |

Further, an example of the gradation-mapping correcting condition table 62 is indicated in the following.

TABLE 2

| | GRADATION MAPPING CORRETING CONDITION |
|---|---|
| CRT DISPLAY (OFFICE) | A |
| CRT DISPLAY (HOME) | B |
| PROJECTED BY PROJECTOR (DARK ROOM) | C |
| ... | |
| POSTER | A |

Figure 9:
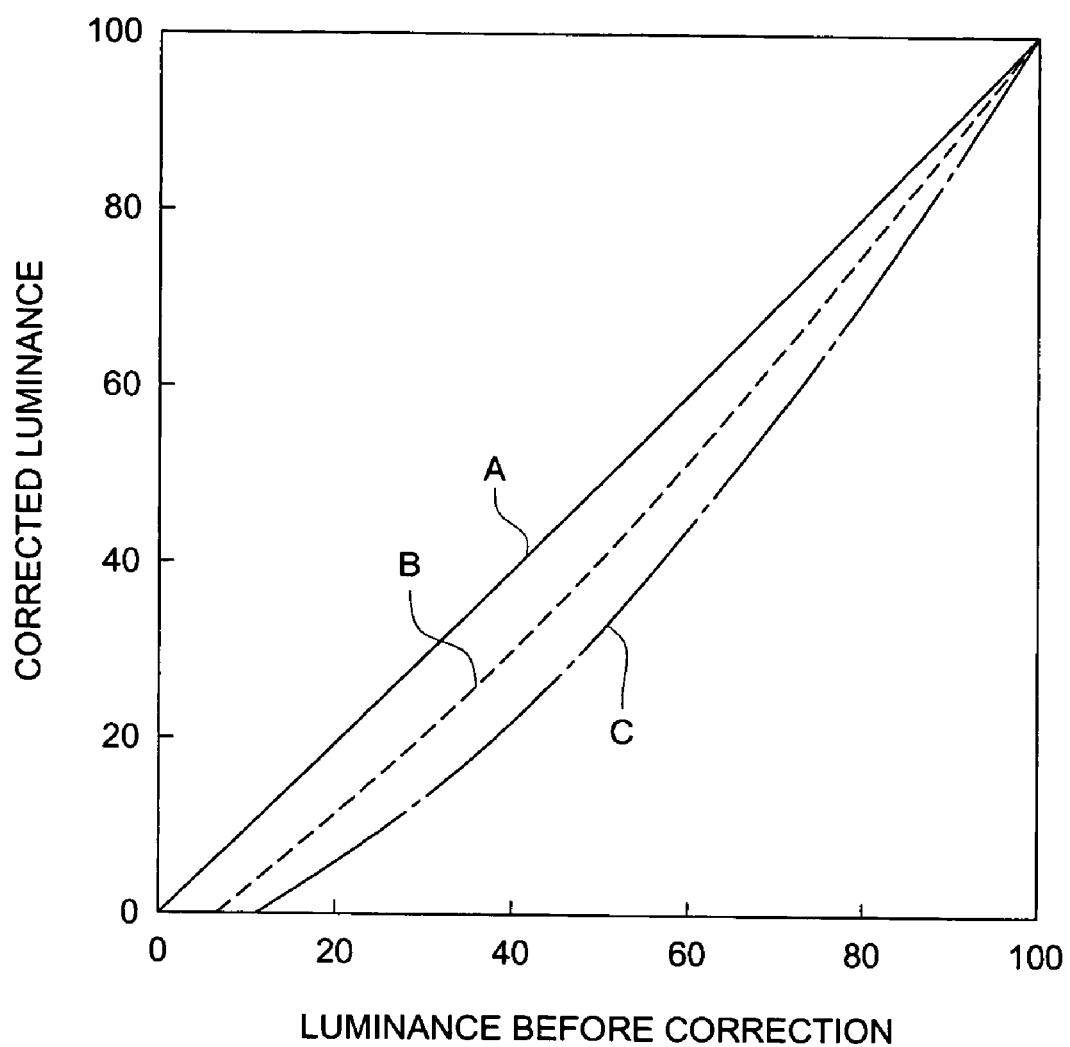
FIG. 9 shows luminance conversion curves indicating relationships of luminance between before and after performing a gradation-mapping correction.

FIG. 9 shows luminance conversion curves indicating relationships of luminance between before and after performing the gradation-mapping correction. Each of symbols A, B, C filled in the gradation-mapping correcting condition table 62 indicate each of conversion curves A, B, C shown in FIG. 9. By reading a corrected luminance, which corresponds to a "luminance before correction", equivalent to a value of the gradation-mapping table given as a provisional image-converting condition, on the conversion curve selected, it is possible to obtain a corrected gradation-mapping table.

Through the abovementioned operation, the gradation-mapping table and the white-balance correction coefficient, both calculated by the provisional image-converting condition correcting section 523, are outputted as the image-converting condition from data analyzing section 52 and sent to image transform section 53.

Next, functions of the observing-condition table referring section 524 will be detailed in the following. The storage section 20 of image-processing apparatus 100 stores observing-condition table 63 that describes relationships between the observing conditions designated and the concrete parameters to be employed for calculations of the color appearance model.

Further, an example of observing-condition table 63, in the case that the color appearance model is CIECAM02, is indicated in the following.

TABLE 3

| OBSERVING CONDITION | OBSERVING-CONDITION PARAMETERS | | | | | | | |
|---|---|---|---|---|---|---|---|---|
| | Xw | Yw | Zw | LA | Yb | C | Nc | F |
| CRT DISPLAY (OFFICE) | 95.043 | 100.000 | 108.879 | 16 | 18 | 0.69 | 1.0 | 1.0 |
| CRT DISPLAY (HOME) | 95.043 | 100.000 | 108.879 | 16 | 18 | 0.59 | 0.95 | 0.9 |
| PROJECTED BY PROJECTOR (DARK ROOM) | 95.043 | 100.000 | 108.879 | 47.74 | 18 | 0.525 | 0.8 | 0.8 |
| ... | | | | | | | | |
| POSTER | 96.42 | 100.000 | 82.49 | 63.66 | 18 | 0.69 | 1.0 | 1.0 |

In the observing-condition table referring section 524, the observing-condition parameters corresponding to the inputted observing-condition are retrieved from observing-condition table 63, so as to output the retrieved values as provisional observing-condition parameters.

In observing-condition parameter correcting section 525, the provisional observing-condition parameters are corrected on the basis of the analyzing results of the image contents inputted from the image-content analyzing section 521. In the color appearance model of general purpose, the background is defined as an area that is located outside about 2° of the visual field and within 10° of the visual field, while the adapting field is defined as an area that is located outside 10° of the visual field. When the area of the background and the adapting field is located outside the visual image, the luminance of the area of the background and the adapting field depends on its peripheral observing environment. While, when the area of the background and the adapting field is located within the visual image due to the large-sized visual image, the luminance of the area will be influenced by the condition of the visual image. When such state could be predicted, the observing-condition parameter correcting section 525 corrects the provisional observing-condition parameters so as to output the corrected values as the observing-condition parameters. Or, when such the state could not be predicted, the observing-condition parameter correcting section 525 outputs the values of the provisional observing-condition parameters, as it is, as the observing-condition parameters.

Concretely speaking, storage section 20 of image-processing apparatus 100 stores the observing-condition parameter correction-weight table 64 shown as follow.

TABLE 4

| OBSERVING CONDITION | OBSERVING-CONDITION PARAMETER CORRECTION-WEIGHT COEFFICIENTS | | | | | | | |
|---|---|---|---|---|---|---|---|---|
| | Xw | Yw | Zw | LA | Yb | C | Nc | F |
| CRT DISPLAY (OFFICE) | 0 | 0 | 0 | 0 | 0.2 | 0 | 0 | 0 |
| CRT DISPLAY (HOME) | 0 | 0 | 0 | 0 | 0.2 | 0 | 0 | 0 |
| PROJECTED BY PROJECTOR (DARK ROOM) | 0 | 0 | 0 | 0.5 | 0.8 | 0 | 0 | 0 |
| ... | | | | | | | | |
| POSTER | 0 | 0 | 0 | 0.2 | 0.5 | 0 | 0 | 0 |

According to the observing condition designated, each of parameter correction-weight coefficients (w) is acquired from the table indicated in the above. Based on coefficient "w", the observing-condition parameter is calculated by employing equation (6) shown as follow.

$$P_{corr} = P_{temp} \times (1-w) + P_{fig} \times w \quad (6)$$

where $P_{temp}$: provisional observing-condition parameter,
$P_{fig}$: observing-condition parameter calculated from the visual image,
$P_{corr}$: observing-condition parameter.

Incidentally, the observing-condition parameters calculated from the visual image are calculated by employing equations (7), (8) shown as follow.

in the case of LA $$LA_{fig} = (V_{avg}/100) \times Y_w \quad (7)$$

in the case of Yb $$Yb_{fig} = (V_{avg}/100) \times Y_w \quad (8)$$

where $V_{avg}$: average brightness value of visual image.

According to the abovementioned process, the observing-condition parameters calculated by the observing-condition parameter correcting section 525 are outputted from data analyzing section 52, and sent to formatting section 54.

As a result of the arithmetic operation performed in data analyzing section 52 mentioned in the above, the image-converting condition and the observing-condition parameters corresponding to the observing-condition are calculated.

As shown in FIG. 2, the image-converting condition calculated by data analyzing section 52 is sent to image transform section 53 in which the "image data representing the scene luminance" are transformed to the "image data representing the visual image". The arithmetic calculations performed in image transform section 53 will be detailed in the following. The "image data representing the scene luminance" are recorded as values R', G', B' described in the floating-point notation of an scRGB. Accordingly, R', G', B' are transformed to luminance Y', color differences Cb', Cr' by employing equation (9) shown as follow.

$$\begin{bmatrix} Y' \\ Cb' \\ Cr' \end{bmatrix} = \begin{bmatrix} 0.2990 & 0.5870 & 01140 \\ -0.1687 & -0.3313 & 0.5000 \\ 0.5000 & -04187 & -0.0813 \end{bmatrix} * \begin{bmatrix} R' \\ G' \\ B' \end{bmatrix} \quad (9)$$

Further, luminance Y' is converted to Y'm by applying a given gradation-mapping table. Successively, R'm, G'm, B'm are calculated as the values after applying the gradation mapping by employing equation (10) shown as follow.

$$\begin{bmatrix} R'm \\ G'm \\ B'm \end{bmatrix} = \begin{bmatrix} 1.000 & 0.0000 & 1.4020 \\ 1.000 & -0.3441 & -0.7141 \\ 1.000 & 1.7720 & 0.0000 \end{bmatrix} * \begin{bmatrix} Y'm \\ Cb' \\ Cr' \end{bmatrix} \quad (10)$$

Still further, using the white-balance correction coefficients given as the image-converting condition, the values R'o, G'o, B'o of the "image data representing the visual image" are calculated by employing equation (11) shown as follow.

$$\begin{bmatrix} R'o \\ G'o \\ B'o \end{bmatrix} = \begin{bmatrix} kR \cdot R'm \\ kG \cdot G'm \\ kB \cdot B'm \end{bmatrix} \quad (11)$$

The values R'o, G'o, B'o calculated in the above are sent to formatting section 54 as the "image data representing the visual image".

Then, formatting section 54 receives the "image data representing the visual image" calculated in the above and the observing-condition parameters, and outputs a visual image file, which is created in the designated image format based on the visual image creating conditions, including designation commands, such as a file-type of the visual image to be created, an image size, a color space, etc., designated from a dialogue window (not shown in the drawings) displayed on the screen.

In formatting section 54, initially, values R'o, G'o, B'o described in the floating-point notation of the scRGB are transformed into a color space expression designated for an outputting use. For instance, when the color space of outputting use is scRGB, the pixel values Ro, Go, Bo of outputting use are calculated by employing equation (12) shown as follow.

$$\begin{bmatrix} Ro \\ Go \\ Bo \end{bmatrix} = \begin{bmatrix} \text{round}\{(R'o \times 8192.0) + 4096\} \\ \text{round}\{(G'o \times 8192.0) + 4096\} \\ \text{round}\{(B'o \times 8192.0) + 4096\} \end{bmatrix} \quad (12)$$

According to the image format, the observing condition sent from data analyzing section 52 is attached to the pixel values Ro, Go, Bo of outputting use, acquired in the above process, so as to output the pixel values Ro, Go, Bo attached with the observing condition. At this time, the observing condition parameters are stored in the visual image file as metadata, and are outputted in a form of being attached to the "image data representing the visual image". Although the metadata could be formed in an arbitral format, for instance, when the DCF/Exif file format is employed for the metadata, they can be stored in an area indicated as the manufacturer's note. Incidentally, it is applicable that the contents of the aforementioned image converting condition are included in the metadata.

Figure 10:
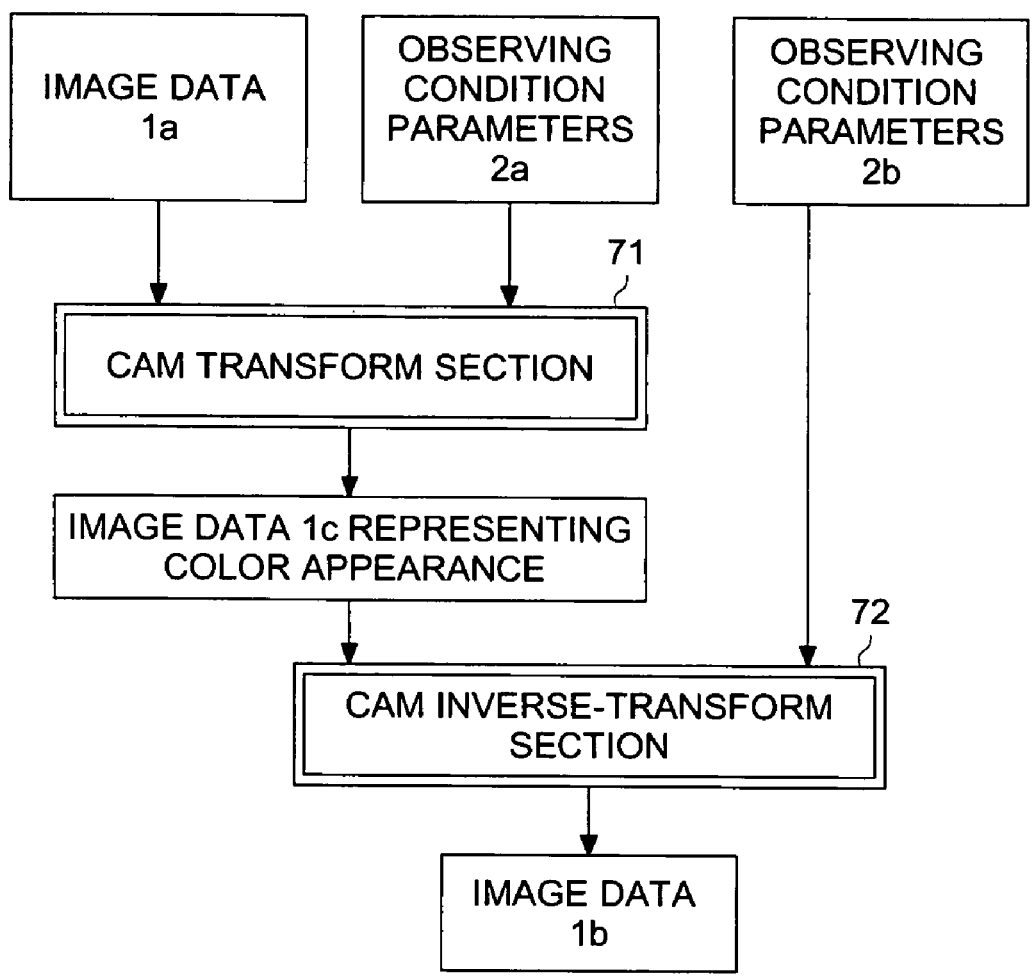
FIG. 10 shows a summarized block diagram of a color management.

The visual image file attached with the observing condition parameters and outputted from image-processing apparatus 100 are read by various kinds of image displaying devices and image printing devices, such as monitor 41, printer 46, projector 47, etc., in each of which the color management according to the specific color appearance model is conducted. FIG. 10 shows a summarized block diagram of the color management.

The image displaying device or the image printing device includes CAM transform section 71 and CAM inverse-transform section 72. The image data 1*a* and observing condition parameters 2*a* are inputted into CAM transform section 71 in which image data 1*a* are transformed to image data 1*c* representing the "color appearance". Then, observing condition parameters 2*b*, established in the image displaying device or the image printing device, and image data 1*c* representing the "color appearance" are inputted into CAM inverse-transform section 72 in which image data 1*c* are inverse-transformed to image data 1*b* corresponding to observing condition parameters 2*b*.

Referring to an example in which the CIECAM97s is employed as the color appearance model, the color management shown in FIG. 10 will be further detailed in the following. Incidentally, the fundamental structure of the CIECAM02 is substantially the same as that of the CIECAM97s to such an extent that the equations employed in the CIECAM02 are partially revised from those employed in the CIECAM97s.

Figure 11:
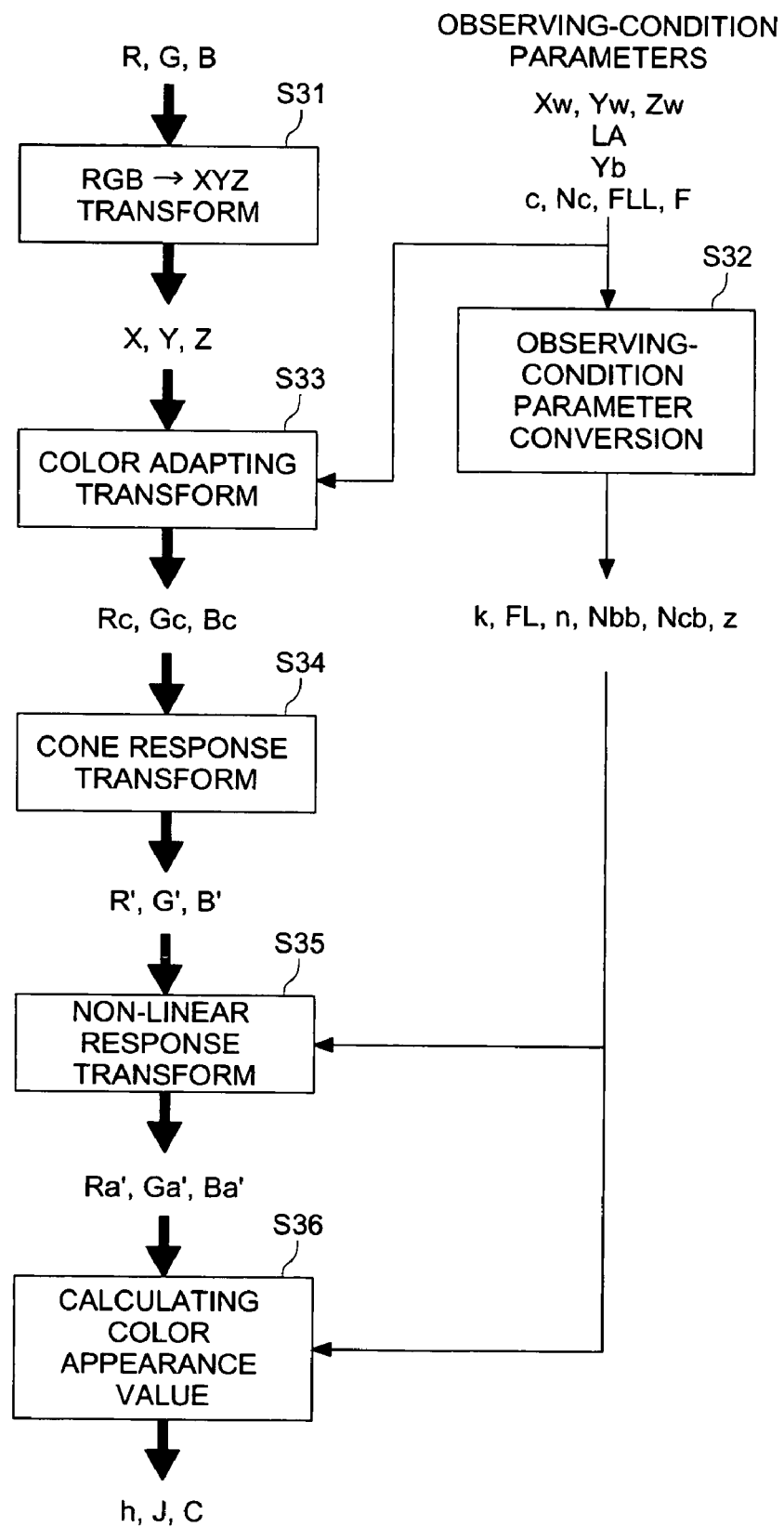
FIG. 11 shows a flowchart of a CAM transform processing performed by CAM transform section 71.

FIG. 11 shows a flowchart of the CAM transform processing performed by CAM transform section 71. Initially, the present embodiment will be detailed by employing the CIECAM97s as an appearance model. The model input data required to be inputted into the model are shown as follow.

Tristimulus values of color to be predicted: X, Y, Z

Observing condition parameters

Tristimulus values of white in the adapting field: Xw, Yw, Zw

Average luminance in the adapting field: LA

Relative luminance of the source background: Yb

Constants determined by the surround conditions: c, Nc, FLL, F

First, the RGB values of each of pixels represented by the input image data are transformed to tristimulus values X, Y, Z (step S31). In this operation, the tristimulus values of the color to be predicted are calculated from the RGB values of each of the pixels represented by image data 1*a*. For instance, when image data 1*a* are described in the scRGB, image data 1*a* can be transformed to tristimulus values X, Y, Z by employing equations (13), (14) shown as follow.

$$\begin{pmatrix} R' \\ G' \\ B' \end{pmatrix} = \begin{pmatrix} (R \div 8192.0) - 0.5 \\ (G \div 8192.0) - 0.5 \\ (B \div 8192.0) - 0.5 \end{pmatrix} \quad (13)$$

$$\begin{pmatrix} X \\ Y \\ Z \end{pmatrix} = \begin{pmatrix} 0.4124 & 0.3576 & 0.1805 \\ 0.2126 & 0.7152 & 0.0722 \\ 0.0193 & 0.1192 & 0.9505 \end{pmatrix} \begin{pmatrix} R' \\ G' \\ B' \end{pmatrix} \quad (14)$$

Further, when image data 1*a* are described in the sRGB, equations (15) through (18) shown as follow could be emplyed.

$$R_{sRGB} = R/255$$

$$G_{sRGB} = G/255$$

$$B_{sRGB} = B/255 \quad (15)$$

When $R_{sRGB}$, $G_{sRGB}$, $B_{sRGB} \leq 0.04045$, $$R' = R_{sRGB} = B/12.92$$

$$G' = G_{sRGB} = B/12.92$$

$$B' = B_{sRGB} = B/12.92 \tag{16}$$

Other than the above case, $$\left.\begin{array}{l} R' = [(R_{sRGB} + 0.055)/1.055]^{2.4} \\ G' = [(G_{sRGB} + 0.055)/1.055]^{2.4} \\ B' = [(B_{sRGB} + 0.055)/1.055]^{2.4} \end{array}\right\} \tag{17}$$

$$\begin{pmatrix} X \\ Y \\ Z \end{pmatrix} = \begin{pmatrix} 0.4124 & 0.3576 & 0.1805 \\ 0.2126 & 0.7152 & 0.0722 \\ 0.0193 & 0.1192 & 0.9505 \end{pmatrix} \begin{pmatrix} R' \\ G' \\ B' \end{pmatrix} \tag{18}$$

Still further, when image data 1a are raw data, image data 1a can be transformed to tristimulus values X, Y, Z by employing the ICC profile in which the characteristics of the digital camera are described. Concretely speaking, the above-mentioned transformation is conducted by using information of the 3×3 matrix described in the ICC profile.

Still further, values k, $F_L$, n, $N_{bb}$, z to be employed for the calculations later on, are calculated from the observing condition parameters by employing equations (19) through (23) shown as follow (step S32).

$$k = \frac{1}{5 \cdot LA + 1} \tag{19}$$

$$F_L = 0.2 \cdot k^4 \cdot (5 \cdot LA) + 0.1 \cdot (1 - k^4)^2 \cdot (5 \cdot LA)^{\frac{1}{3}} \tag{20}$$

$$n = \frac{Yb}{Yw} \tag{21}$$

$$N_{bb} = N_{cb} = 0.725 \cdot \left(\frac{1}{n}\right)^{0.2} \tag{22}$$

$$z = 1 + F_{LL} \cdot n^{1/2} \tag{23}$$

Still further, the chromatic-adaptation transform is applied to the image data (step S33). The chromatic-adaptation transform is a modified von Kries-type transformation in which the degree of adaptation for the source white under the observing condition is taken into account. At first, tristimulus values X, Y, Z are transformed to values R-bar, G-bar, B-bar by employing equation (24) shown as follow.

$$\begin{pmatrix} \overline{R} \\ \overline{G} \\ \overline{B} \end{pmatrix} = M_B \cdot \begin{pmatrix} X/Y \\ Y/Y \\ Z/Y \end{pmatrix} \tag{24}$$

Now, equation (25) shown as follow is employed as the transforming matrix $M_B$ $$M_B = \begin{pmatrix} 0.8951 & 0.2664 & -0.1614 \\ -0.7502 & 1.7135 & 0.0367 \\ 0.0389 & 0.0685 & 1.0296 \end{pmatrix} \tag{25}$$

The response values Rc, Gc, Bc as a result of the chromatic-adaptation transform are calculated from values R-bar, G-bar, B-bar transformed in the above by employing equations (26) through (28) shown as follow.

$$\left.\begin{array}{l} Rc = \left[\frac{D}{Rw} + (1-D)\right] \cdot \overline{R} \\ Gc = \left[\frac{D}{Gw} + (1-D)\right] \cdot \overline{G} \\ Bc = \left[\frac{D}{Bw^p} + (1-D)\right] \cdot |\overline{B}|^p \end{array}\right\} \tag{26}$$

$$p = Bw^{0.0834} \tag{27}$$

$$D = F - F/[1 + 2(L_A^{1/4}) + (L_A^2)/300] \tag{28}$$

Wherein the tristimulus values of the adapting white are transformed to values Rw, Gw, Bw by applying the transforming matrix $M_B$.

Then, the image data processed by the chromatic-adaptation transform are further transformed to the cone responses R', G', B', wherein the cone corresponds to the sensor of the human's visual system (step S34). The inverse-transform, for the previous transform employing the matrix $M_B$, is conducted at first by employing equations (29) through (31) shown as follow, and then, the 3×3 matrix, called as the Hunt-Pointer-Estevez transform, is applied.

$$\begin{pmatrix} R' \\ G' \\ B' \end{pmatrix} = M_{HPE} \cdot M_B^{-1} \begin{pmatrix} Rc \cdot Y \\ Gc \cdot Y \\ Bc \cdot Y \end{pmatrix} \tag{29}$$

$$M_B^{-1} = \begin{pmatrix} 0.9870 & -0.1471 & 0.1600 \\ 0.4323 & 0.5184 & 0.0493 \\ -0.0085 & 0.0400 & 0.9685 \end{pmatrix} \tag{30}$$

$$M_{HPE} = \begin{pmatrix} 0.38971 & 0.68898 & -0.07868 \\ -0.22981 & 1.18340 & 0.04641 \\ 0 & 0 & 1 \end{pmatrix} \tag{31}$$

As a next step, the transform corresponding to a nonlinear response of visual sense is applied to the image data transformed to the cone responses R', G', B' by employing equation (32) shown as follow (step S35).

$$\left.\begin{array}{l} Ra' = \dfrac{40 \cdot \left(F_L \cdot \dfrac{R'}{100}\right)^{0.73}}{\left[\left(F_L \cdot \dfrac{R'}{100}\right)^{0.73} + 2\right]} + 1 \\ Ga' = \dfrac{40 \cdot \left(F_L \cdot \dfrac{G'}{100}\right)^{0.73}}{\left[\left(F_L \cdot \dfrac{G'}{100}\right)^{0.73} + 2\right]} + 1 \\ Ba' = \dfrac{40 \cdot \left(F_L \cdot \dfrac{B'}{100}\right)^{0.73}}{\left[\left(F_L \cdot \dfrac{B'}{100}\right)^{0.73} + 2\right]} + 1 \end{array}\right\} \tag{32}$$

Finally, the numerical values for predicting the "color appearance", such as hue angle: h, Lightness: J, and chroma: C are respectively calculated according to equations (33) through (40) shown as follow (step S36), and then, the CAM transform processing is finalized.

$$h = \tan^{-1}(b/a) \quad (33)$$

$$a = Ra' - 12 \cdot Ga'/11 + Ba'/11 \quad (34)$$

$$b = (1/9) \cdot (Ra' + Ga' - 2 \cdot Ba') \quad (35)$$

$$J = 100 \cdot (A/Aw)^{0.2} \quad (36)$$

$$A = [2 \cdot Ra' + Ga' + (1/20) \cdot Ba' - 0.305] \cdot N_{bb} \quad (37)$$

(Aw is calculated from Ra', Ga', Ba' acquired by transforming Xw, Yw, Zw in the same manner.)

$$C = 2.44 \cdot s^{0.69} (L/100)^{0.67n} (1.64 - 0.29^n) \quad (38)$$

$$s = \frac{50 \cdot (a^2 + b^2)^{\frac{1}{2}} 100 \cdot e \cdot (10/13) Nc \cdot Ncb}{Ra' + Ga' + (21/20) \cdot Ba'} \quad (39)$$

$$e = e_1 + (e_2 - e_1)(h - h_1)/(h_2 - h_1) \quad (40)$$

The values $h_1$, $h_2$, $e_1$, $e_2$ employed in equation (40) should be retrieved from Table 5 shown as follow.

In the case of $h < h_1$, $h' = h + 360$. Other than this case, $h' = h$. Then, "i" that fulfills $H_i \leq h' < h_{i+1}$ is found from Table 5, and is used as $h_1 = h_1$, $h_2 = h_{i+1}$, $e_1 = e_i$, $e_2 = e_{i+1}$.

TABLE 5

| | i | | | | |
|---|---|---|---|---|---|
| | 1 | 2 | 3 | 4 | 5 |
| $h_i$ | 20.14 | 90.00 | 164.25 | 237.53 | 380.14 |
| $e_i$ | 0.8 | 0.7 | 1.0 | 1.2 | 0.8 |
| $H_i$ | 0.0 | 100.0 | 200.0 | 300.0 | 400.0 |

Further, when the CIECAM02 is employed as the color appearance model, processing step 32 and its post-processing steps of the CAM transform processing shown in FIG. 11 are replaced with the following steps.

Still further, in step S32, values k, $F_L$, n, $N_{bb}$, z are calculated from the observing condition parameters established in advance by employing equations (19') through (23') shown as follow.

$$k = \frac{1}{5 \cdot LA + 1} \quad (19')$$

$$F_L = 0.2 \cdot k^4 \cdot (5 \cdot LA) + 0.1 \cdot (1 - k^4)^2 \cdot (5 \cdot LA)^{\frac{1}{3}} \quad (20')$$

$$n = \frac{Yb}{Yw} \quad (21')$$

$$N_{bb} = N_{cb} = 0.725 \cdot \left(\frac{1}{n}\right)^{0.2} \quad (22')$$

$$z = 1.48 + \sqrt{n} \quad (23')$$

Still further, in step S33, the chromatic-adaptation transform is applied to the image data. The chromatic-adaptation transform is a modified von Kries-type transformation in which the degree of adaptation for the source white under the observing condition is taken into account. At first, tristimulus values X, Y, Z are transformed to values R-bar, G-bar, B-bar by employing equation (24') shown as follow.

$$\begin{pmatrix} \overline{R} \\ \overline{G} \\ \overline{B} \end{pmatrix} = M_{CAT02} \cdot \begin{pmatrix} X \\ Y \\ Z \end{pmatrix} \quad (24')$$

Now, equation (25') shown as follow is employed as the transforming matrix $M_{CAT02}$ $$M_{CAT02} = \begin{pmatrix} 0.7328 & 0.4296 & -0.1624 \\ -0.7036 & 1.6975 & 0.0061 \\ 0.0030 & 0.0136 & 0.9834 \end{pmatrix} \quad (25')$$

The response values Rc, Gc, Bc as a result of the chromatic-adaptation transform are calculated from values R-bar, G-bar, B-bar transformed in the above by employing equations (26'), (28') shown as follow.

$$Rc = \left[ Yw \cdot \frac{D}{Rw} + (1 - D) \right] \cdot \overline{R}$$

$$Gc = \left[ Yw \cdot \frac{D}{Gw} + (1 - D) \right] \cdot \overline{G} \quad (26')$$

$$Bc = \left[ Yw \cdot \frac{D}{Bw} + (1 - D) \right] \cdot \overline{B}$$

$$D = F\left[ 1 - \left(\frac{1}{3.6}\right) e^{\left(\frac{-L_A - 42}{92}\right)} \right] \quad (28')$$

(where "e" represents the base of the natural logarithm)

Wherein the tristimulus values of the adapting white are transformed to values Rw, Gw, Bw by applying the transforming matrix $M_{CAT02}$.

Then, in step S34, the image data processed by the chromatic-adaptation transform are further transformed to the cone responses R', G', B', wherein the cone corresponds to the sensor of the human's visual system. The inverse-transform, for the previous transform employing the matrix $M_{CAT02}$, is conducted at first by employing equations (29') through (31') shown as follow, and then, the 3×3 matrix, called as the Hunt-Pointer-Estevez transform, is applied.

$$\begin{pmatrix} R' \\ G' \\ B' \end{pmatrix} = M_{HPE} \cdot M_{CAT02}^{-1} \begin{pmatrix} Rc \\ Gc \\ Bc \end{pmatrix} \quad (29')$$

$$M_{CAT02}^{-1} = \begin{pmatrix} 1.096124 & -0.278869 & 0.182745 \\ 0.454369 & 0.473533 & 0.072098 \\ -0.009628 & -0.005698 & 1.015326 \end{pmatrix} \quad (30')$$

$$M_{HPE} = \begin{pmatrix} 0.38971 & 0.68898 & -0.07868 \\ -0.22981 & 1.18340 & 0.04641 \\ 0 & 0 & 1 \end{pmatrix} \quad (31')$$

In next step S35, the transform corresponding to a nonlinear response of visual sense is applied to the image data transformed to the cone responses R', G', B' by employing equation (32') shown as follow.

$$Ra' = \frac{400 \cdot \left(F_L \cdot \frac{R'}{100}\right)^{0.42}}{27.13 + \left(F_L \cdot \frac{R'}{100}\right)^{0.42}} + 0.1$$

$$Ga' = \frac{400 \cdot \left(F_L \cdot \frac{G'}{100}\right)^{0.42}}{27.13 + \left(F_L \cdot \frac{G'}{100}\right)^{0.42}} + 0.1 \quad (32')$$

$$Ba' = \frac{400 \cdot \left(F_L \cdot \frac{B'}{100}\right)^{0.42}}{27.13 + \left(F_L \cdot \frac{B'}{100}\right)^{0.42}} + 0.1$$

Finally, in step S36, the numerical values for predicting the "color appearance", such as hue angle: h, Lightness: J, and chroma: C are respectively calculated according to equations (33') through (40') shown as follow.

$$h = \tan^{-1}(b/a) \quad (33')$$

$$a = Ra' - 12 \cdot Ga'/11 + Ba'/11 \quad (34')$$

$$b = (1/9) \cdot (Ra' + Ga' - 2 \cdot Ba') \quad (35')$$

$$J = 100 \cdot (A/Aw)^{0.2} \quad (36')$$

$$A = [2 \cdot Ra' + Ga' + (1/20) \cdot Ba' - 0.305] \cdot N_{bb} \quad (37')$$

(Aw is calculated from Ra', Ga', Ba' acquired by transforming Xw, Yw, Zw in the same manner.)

$$C = t^{0.9} \cdot \sqrt{J/100} \cdot (1.64 - 0.29^{n'})^{0.73} \quad (38')$$

$$t = \frac{e_1 \cdot (a^2 + b^2)^{1/2}}{Ra' + Ga' + (21/20) \cdot Ba'} \quad (39')$$

$$e_1 = \left(\frac{12500}{13} \cdot Nc \cdot Ncb\right) \cdot \left[\cos\left(h \cdot \frac{\pi}{180} + 2\right) + 3.8\right] \quad (40')$$

According to the transform processing mentioned in the above, values R, G, B of the image data are transformed to values J, C, h representing the "color appearance".

Figure 12:
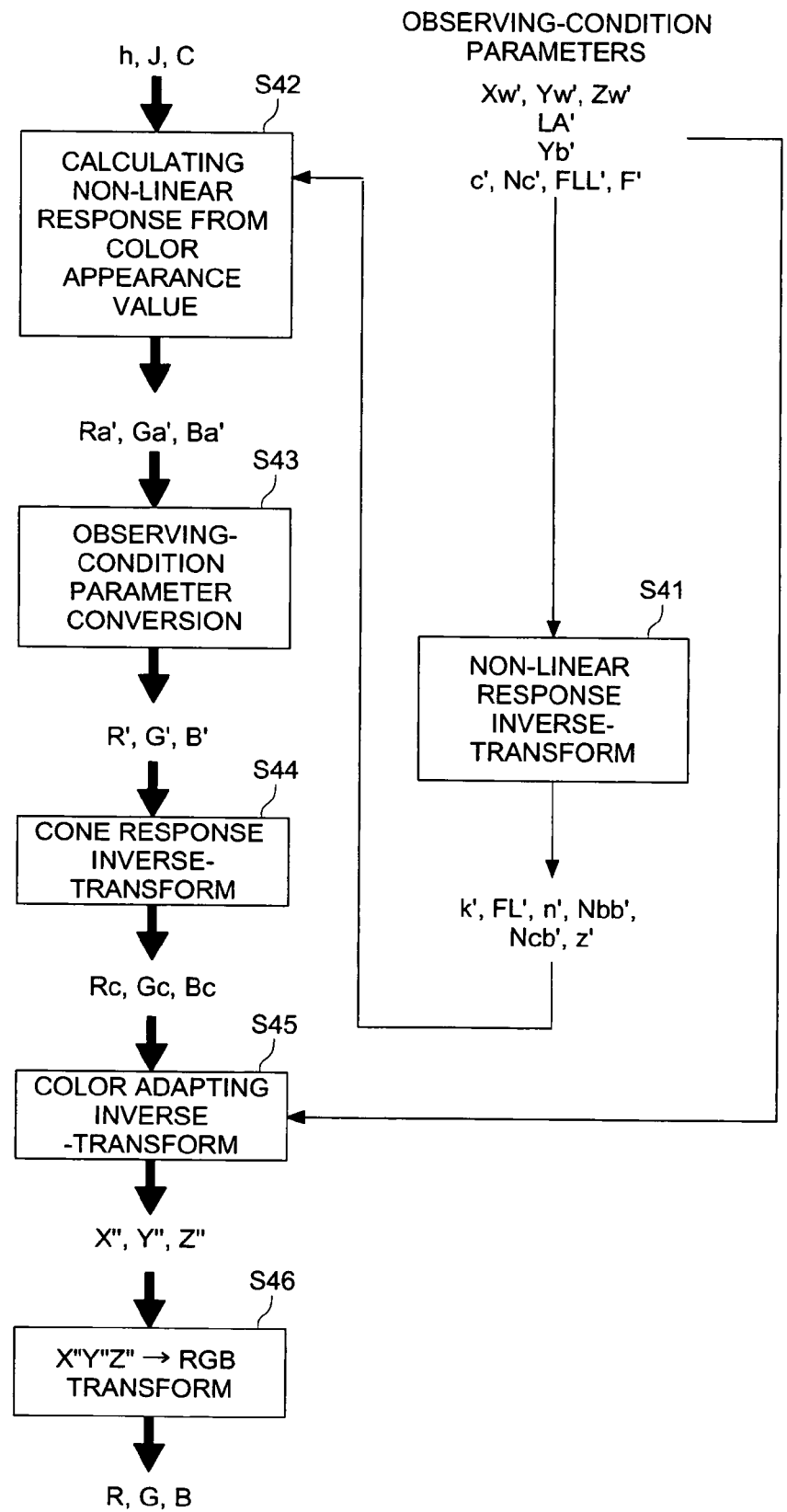
FIG. 12 shows a flowchart of a CAM inverse-transform processing performed by CAM inverse-transform section 72.
Figure 13:
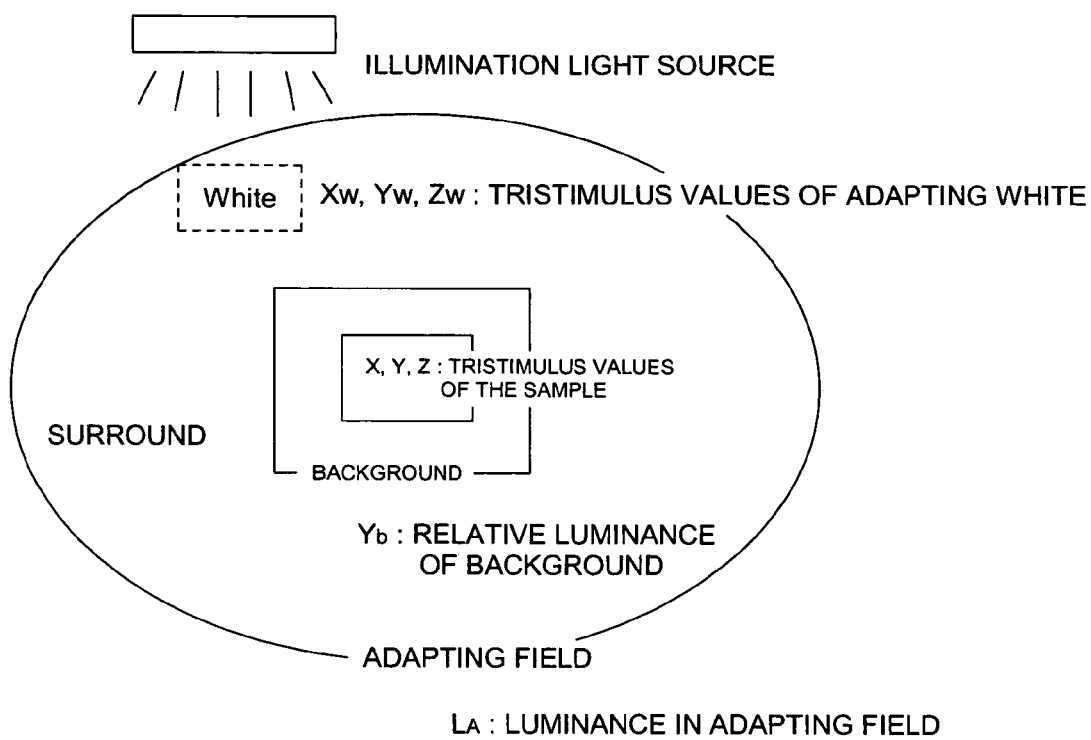
FIG. 13 shows concrete viewing condition parameters specified in the CIECAM97s.

FIG. 12 shows a flowchart of the CAM inverse-transform processing performed by CAM inverse-transform section 72. Initially, the present embodiment will be detailed by employing the CIECAM97s as a color appearance model. At first, variables k', $F_L$', $N_{bb}$', Z' are calculated from second observing condition parameters Xw', Yw', Zw', LA', Yb', c', Nc', $F_{LL}$', F' relating to the output image by employing equations (41) through (45) shown as follow (step S41).

$$k' = \frac{1}{5 \cdot LA' + 1} \quad (41)$$

$$F_L' = 0.2 \cdot k'^4 \cdot (5 \cdot LA') + 0.1 \cdot (1 - k'^4)^2 \cdot (5 \cdot LA')^{\frac{1}{3}} \quad (42)$$

$$n' = \frac{Yb'}{Yw'} \quad (43)$$

$$N_{bb}' = N_{cb}' = 0.725 \cdot \left(\frac{1}{n'}\right)^{0.2} \quad (44)$$

$$z' = 1 + F_{LL}' \cdot n'^{1/2} \quad (45)$$

In addition, Aw is calculated by applying the arithmetic calculations to be performed in steps S33 through S36 in the flowchart of the CAM transform processing shown in FIG. 11.

Then, nonlinear response values Ra', Ga', Ba' are calculated from parameters J, C, h, which represent the "color appearance" (step S42). At first, values A, s are found from parameters J, C by employing equations (46), (47) shown as follow.

$$A = Aw' \cdot (J/100)^{1/c'z'} \quad (46)$$

$$s = C^{1/0.69}/[2.44 \cdot (J/100)^{0.67n'}(1.64 - 0.29^{n'})]^{1/0.69} \quad (47)$$

Further, values a, b are found by employing equations (48), (49) shown as follow.

$$a = \frac{s \cdot (A/N_{bb}' + 2.05)}{\left\{\begin{array}{l}[1 - \tan^2(h)]^{1/2}[5000 \cdot e \cdot Nc' \cdot Ncb'/13] + \\ s[11/23 + (108/23) \cdot \tan(h)]\end{array}\right\}} \quad (48)$$

$$b = a \cdot \tan(h) \quad (49)$$

Wherein the polarity of the first coefficient in the denominator of equation (49) is defined as follow.

$$0 \leq h < 90 [1 + \tan^2(h)]^{1/2}$$

$$90 \leq h < 270 - [1 + \tan^2(h)]^{1/2}$$

$$270 \leq h < 360 [1 + \tan^2(h)]^{1/2}$$

Further, "e" is also defined as follow.

$$e = e_1 + (e_2 - e_1)(h - h_1)/(h_2 - h_1) \quad (50)$$

The values $h_1$, $h_2$, $e_1$, $e_2$ employed in equation (50) should be retrieved from Table 6 shown as follow.

In the case of h<$h_1$, h'=h+360. Other than this case, h'=h. Then, "i" that fulfills $h_i \leq h' < h_{i+1}$ is found from Table 6, and is used as $h_1 = h_i$, $h_2 = h_{i+1}$, $e_1 = e_i$, $e_2 = e_{i+1}$.

TABLE 6

| | i | | | | |
|---|---|---|---|---|---|
| | 1 | 2 | 3 | 4 | 5 |
| $h_i$ | 20.14 | 90.00 | 164.25 | 237.53 | 380.14 |
| $e_i$ | 0.8 | 0.7 | 1.0 | 1.2 | 0.8 |

The values Ra', Ga', Ba' are calculated by employing equation (51) shown as follow.

$$Ra' = (20/61) \cdot (A/N_{bb}' + 2.05) + (41/61) \cdot (11/23) \cdot a + (288/61) \cdot (1/23) \cdot b$$

$$Ga' = (20/61) \cdot (A/N_{bb}' + 2.05) + (81/61) \cdot (11/23) \cdot a + (261/61) \cdot (1/23) \cdot b \quad (51)$$

$$Ba' = (20/61) \cdot (A/N_{bb}' + 2.05) + (20/61) \cdot (11/23) \cdot a + (20/61) \cdot (315/23) \cdot b$$

As the next step, in order to find cone responses R', G', B', the nonlinear response values Ra', Ga', Ba' are inverse-transformed by employing equation (52) shown as follow (step S43).

$$R' = 100 \cdot [(2 \cdot Ra' - 2)/(41 - Ra')]^{1/0.73}$$
$$G' = 100 \cdot [(2 \cdot Ga' - 2)/(41 - Ga')]^{1/0.73} \quad (52)$$
$$B' = 100 \cdot [(2 \cdot Ba' - 2)/(41 - Ba')]^{1/0.73}$$

Incidentally, in the case of Ra'+1<0, following equation (53) should be employed as well as Ga', Ba'.

$$R' = -100 \cdot [(2 - 2 \cdot Ra')/(39 - Ra')]^{1/0.073} \quad (53)$$

Then, according to equations (54), (55) shown as follow, values RcY, GcY, BcY are calculated by inverse-transforming cone responses R', G', B' (step S43).

$$\begin{pmatrix} RcY \\ GcY \\ BcY \end{pmatrix} = M_B \cdot M_{HPE}^{-1} \begin{pmatrix} R' \\ G' \\ B' \end{pmatrix} \quad (54)$$

$$M_{HPE} = \begin{pmatrix} 1.91019 & -1.11214 & 0.20195 \\ 0.37095 & 0.62905 & 0 \\ 0 & 0 & 1 \end{pmatrix} \quad (55)$$

Further, the chromatic-adaptation inverse-transform is applied to values RcY, GcY, BcY so as to resume the colorimetry values (step S45). At first, value Yc is calculated by employing equation (56) shown as follow.

$$Yc = 0.43231 \cdot RcY + 0.51836 \cdot GcY + 0.04929 \cdot BcY \quad (56)$$

Successively, (Y/Yc)R, (Y/Yc)R, (Y/Yc)$^{1/P}$B are calculated by employing equation (57) shown as follow.

$$(Y/Yc)R = (Y/Yc)Rc/[D(1/Rw) + 1 - D]$$
$$(Y/Yc)G = (Y/Yc)Gc/[D(1/Gw) + 1 - D] \quad (57)$$
$$(Y/Yc)^{1/P}B = [|(Y/Yc)Bc|]^{1/p}/[D(1/Bw^p) + 1 - D]^{1/p}$$

Where, in the case of (Y/Yc)<0, (Y/Yc)$^{1/P}$B is established as a negative value. Then, value Y' is calculated by employing equation (58) shown as follow.

$$Y' = 0.43231 x YR + 0.51836 x YG + 0.04929 x (Y/Yc)^{1/P} BYc \quad (58)$$

The tristimulus values X", Y", Z" are calculated by employing equation (59) shown as follow.

$$\begin{pmatrix} X'' \\ Y'' \\ Z'' \end{pmatrix} = M^{-1} \begin{pmatrix} Yc(Y/Yc)R \\ Yc(Y/Yc)G \\ Yc(Y/Yc)^{1/P}B/Yc(Y'/Yc)^{(1/p-1)} \end{pmatrix} \quad (59)$$

As described in the foregoing, the values representing the "color appearance" and the tristimulus values X", Y", Z", corresponding to "Appearance" designated in an environment, are calculated from the second observing environment parameters.

The tristimulus values X", Y", Z" are further transformed to the color space (R, G, B) of the output device so as to output them, and then, the CAM inverse-transform processing is finalized. Concretely speaking, the abovementioned transformation is conducted by using information of the 3×3 matrix described in the ICC profile in which characteristics of a monitor or a printer are described, or by using the three-dimensional look-up table.

On the other hand, when the CIECAM02 is employed as the color appearance model, the CAM inverse-transform processing mentioned in the above would be replaced by the following procedure. At first, in step S41, variables k', $F_L$', $N_{bb}$', Z' are calculated from the second observing condition parameters by employing equations (41') through (45') shown as follow.

$$k' = \frac{1}{5 \cdot LA' + 1} \quad (41')$$

$$F_L = 0.2 \cdot k'^4 \cdot (5 \cdot LA') + 0.1 \cdot (1 - k'^4)^2 \cdot (5 \cdot LA')^{1/3} \quad (42')$$

$$n' = \frac{Yb'}{Yw'} \quad (43')$$

$$N'_{bb} = N'_{cb} = 0.725 \cdot \left(\frac{1}{n'}\right)^{0.2} \quad (44')$$

$$z' = 1.48 + \sqrt{n'} \quad (45')$$

In addition, Aw' is calculated by employing the second observing condition parameters in regard to tristimulus values Xw', Yw', Zw' of white in the adapting field, and by applying the arithmetic calculations to be performed in steps S33 through S36 in the flowchart of the CAM transform processing shown in FIG. 11.

Then, in step S42, the nonlinear response values are calculated from the values of the "color appearance". At first, "i" that fulfills $h_i \leq h' < h_{i+1}$ is found by retrieving the input value of hue angle h from Table 7.

TABLE 7

|   | i |   |   |   |   |
|---|---|---|---|---|---|
|   | 1 | 2 | 3 | 4 | 5 |
| $h_i$ | 20.14 | 90.00 | 164.25 | 237.53 | 380.14 |
| $e_i$ | 0.8 | 0.7 | 1.0 | 1.2 | 0.8 |
| $H_i$ | 0.0 | 100.0 | 200.0 | 300.0 | 400.0 |

According to equation (60) shown as follow, the value h' is calculated by using the abovementioned value "i" and the input value of color component H of "color appearance".

$$h' = \frac{(H - H_i)(e_{i+1} \cdot h_i - e_i \cdot h_{i+1}) - 100 \cdot h_i \cdot e_{i+1}}{(H - H_i)(e_{i+1} - e_i) - 100 \cdot e_{i+1}} \quad (60)$$

Wherein, in the case of h'>360, 360 should be subtracted from h' (namely, corrected h'=h'−360).

Further, according to equation (61) through (67) shown as follow, variables t, e, A, $p_1$, $p_2$, $p_3$, hr are calculated by using the input values of chroma C representing "color appearance" and J representing Lightness.

$$t = \left(\frac{C}{\sqrt{J/100}(1.64 - 0.29^{n'})^{0.73}}\right)^{\frac{1}{0.9}} \quad (61)$$

$$e = \left(\frac{12500}{13} \cdot Nc' \cdot Ncb\right)\left(\cos\left(h' \frac{\pi}{180} + 2\right) + 3.8\right) \quad (62)$$

$$A = Aw'(J/100)^{\frac{1}{c' \cdot z'}} \quad (63)$$

-continued $$p_1 = e/t \quad (64)$$

$$p_2 = \left(\frac{A}{Nbb'}\right) + 0.305 \quad (65)$$

$$P_3 = 21/20 \quad (66)$$

$$h_r = h'\frac{\pi}{180} \quad (67)$$

Still further, if the relationship of $|\sin(h_r)| \geq |\cos(h_r)|$ is fulfilled, the values $P_4$, "b", "a" are calculated by employing equations (68) through (70) shown as follow.

$$p_4 = p_1/\sin(hr) \quad (68)$$

$$b = \frac{p_2(2+p_3)(460/1403)}{p_4 + (2+p_3)(220/1403)(\cos(h_r)/\sin(h_r)) - (27/1403) + p_3(6330/1403)} \quad (69)$$

$$a - b(\cos(h_r)/\sin(h_r)) \quad (70)$$

Still further, if the relationship of $|\sin(h_r)| < |\cos(h_r)|$ is fulfilled, the values $P_5$, "b", "a" are calculated by employing equations (71) through (73) shown as follows.

$$p_5 = p_1/\cos(hr) \quad (71)$$

$$a = \frac{p_2(2+p_3)(460/1403)}{p_5 + (2+p_3)(220/1403) - ((27/1403) - p_3(6330/1403))(\sin(h_r)/\cos(h_r))} \quad (72)$$

$$a - b(\sin(h_r)/\cos(h_r)) \quad (73)$$

Still further, the values Ra', Ga', Ba' are calculated by employing equation (51') shown as follow.

$$\left.\begin{array}{l} Ra' = \frac{460}{1403}p_2 + \frac{451}{1403}a + \frac{288}{1403}b \\ Ga' = \frac{460}{1403}p_2 + \frac{891}{1403}a + \frac{261}{1403}b \\ Ba' = \frac{460}{1403}p_2 + \frac{220}{1403}a + \frac{6300}{1403}b \end{array}\right\} \quad (51')$$

Still further, in step S43, in order to find cone response R', G', B', the nonlinear response values Ra', Ga', Ba' are inverse-transformed by employing equation (52') shown as follow.

$$\left.\begin{array}{l} R' = \text{sign}(Ra' - 0.1)\cdot\frac{100}{F'_L}\cdot\left(\frac{27.13\cdot|Ra'-0.1|}{400-|Ra'-0.1|}\right)^{\frac{1}{0.42}} \\ G' = \text{sign}(Ga' - 0.1)\cdot\frac{100}{F'_L}\cdot\left(\frac{27.13\cdot|Ga'-0.1|}{400-|Ga'-0.1|}\right)^{\frac{1}{0.42}} \\ B' = \text{sign}(Ba' - 0.1)\cdot\frac{100}{F'_L}\cdot\left(\frac{27.13\cdot|Ba'-0.1|}{400-|Ba'-0.1|}\right)^{\frac{1}{0.42}} \end{array}\right\} \quad (52')$$

Wherein sign(x) is such a function that sign(x)=1 when x>0, sign(x)=0 when x=0, sign(x)=−1 when x<0.

Still further, in step S44, the calculation of the cone response inverse-transform is conducted by employing equation (53') shown as follow.

$$\begin{pmatrix} Rc \\ Gc \\ Bc \end{pmatrix} = \begin{pmatrix} 0.7328 & 0.4296 & -0.1624 \\ -0.7036 & 1.6975 & 0.0061 \\ 0.0030 & 0.0136 & 0.9834 \end{pmatrix} \quad (53')$$

$$\begin{pmatrix} 1.910197 & -1.112124 & 0.201908 \\ 0.370950 & 0.629054 & 0.000008 \\ 0 & 0 & 1 \end{pmatrix}\begin{pmatrix} R' \\ G' \\ B' \end{pmatrix}$$

Still further, in step S45, the calculation of the chromatic-adaptation inverse-transform is conducted by employing equations (57'), (59') shown as follow.

$$\left.\begin{array}{l} R = \frac{Rc}{(Yw'\cdot D/Rw' + 1 - D)} \\ G = \frac{Gc}{(Yw'\cdot D/Gw' + 1 - D)} \\ B = \frac{Bc}{(Yw'\cdot D/Bw' + 1 - D)} \end{array}\right\} \quad (58')$$

$$\begin{pmatrix} X'' \\ Y'' \\ Z'' \end{pmatrix} = \begin{pmatrix} 1.096124 & -0.278869 & 0.182745 \\ 0.454369 & 0.473533 & 0.072098 \\ -0.009628 & -0.005698 & 1.015326 \end{pmatrix}\begin{pmatrix} R \\ G \\ B \end{pmatrix} \quad (59')$$

Incidentally, other than the CIECAM97s and the CIECAM02, which are employed in the present embodiment, various kinds of color appearance models, such as the Noya model, the Hunt model, the RLab model, the LLab model, etc., have been proposed so far. Of cause, instead of the CIECAM97s and the CIECAM02, such the color appearance models can be employed in the present embodiment.

According to the abovementioned process, since image data 1a created by image-processing apparatus 100 are transformed to the image data representing the "color appearance" based on the observing condition (observing condition parameters 2a) intended at the time of creating the image data, and then, further transformed to image data 1b representing the "color appearance" as well under the observing condition (observing condition parameters 2b), it becomes possible to conduct an appropriate displaying or printing operation even under the observing condition (observing condition parameters 2b) being different from the observing condition (observing condition parameters 2a) intended at the time of creating the image data.

As described in the foregoing, according to the present embodiment, since data analyzing section 52 calculates the image transforming condition from the result of analyzing the "image data representing the scene luminance" based on the captured image data and the "observing condition intended by the visual image", and image transform section 53 transforms the "image data representing the scene luminance" to the "image data representing the visual image" on the basis of the image transforming condition calculated in the above step, and formatting section 54 attaches the "observing condition parameters corresponding to the observing-condition intended by the visual image" to the "image data representing the visual image" transformed in the above step so as to output the "image data representing the visual image" attached with the observing condition parameters, it becomes possible to easily generate the "image data representing the visual image" being applicable for a color appearance model from captured image data outputted by the digital camera, etc., without conducting specific measurements at the time of the image-capturing operation and without requiring special technical knowledge.

Further, since formatting section 54 attaches the "observing condition parameters corresponding to the observing-condition intended by the visual image" to the "image data representing the visual image" to be outputted, by outputting the "image data representing the visual image" to such apparatuses as various kinds of image-displaying apparatus, a printer, an image-processing apparatus, which conform to a color appearance model, it becomes possible to appropriately reproduce the "color appearance" intended at the time of creating the visual image, even under the observing condition being different from that intended at the time of creating the visual image.

Incidentally, each of the embodiments described in the foregoing is only an example of the image-processing apparatus, serving as a best mode of the present invention. Therefore, the scope of the present invention is not limited to the embodiments cited in the above.

For instance, the present embodiment could be constituted as an image-capturing apparatus, such as the DSC (Digital Still Camera), etc., which is provided with: a image-capturing section for capturing an subject so as to output the captured image data; an image data generating section for generating "image data representing the scene luminance" from the captured image data outputted from the image-capturing section; and image-processing apparatus 100, so that data analyzing section 52 analyzes the "image data representing the scene luminance" generated by the image data generating section.

What is claimed is:

1. An image processing apparatus for converting photographed image data representing a scene luminance into visual image data representing a visual image, comprising:
    a data analyzing section to obtain a viewing condition to view a visual image, to analyze the photographed image data, and to obtain an image converting condition and a viewing condition parameter for a color management employing a color appearance model on the basis of the analysis result of the photographed image data and the viewing condition for the visual image;
    an image converting section to convert the photographed image data on the basis of the image converting condition obtained by the data analyzing section so as to produce the visual, image data; and
    a formatting section to attach the viewing condition parameter to the visual image data produced by the image converting section and to output the visual image data attached with the viewing condition parameter.

2. The image processing apparatus of claim 1, further comprising:
    an operating section to select a viewing condition for a visual Image;
    wherein the data analyzing section obtains a viewing condition parameter corresponding to the viewing condition selected by the operating section, and the formatting section attaches the viewing condition parameter obtained by the data analyzing section to the visual image and outputs the visual image data attached with the viewing condition parameter.

3. The image processing apparatus of claim 1, wherein the data analyzing section obtains a provisional viewing condition parameter corresponding to the viewing condition and obtains the viewing condition parameter by revising the provisional viewing condition parameter in accordance with the analysis result of the photographed image data.

4. The image processing apparatus of claim 1, wherein the image converting condition includes a gradation converting condition to convert the scene luminance into a luminance of the visual image.

5. The image processing apparatus of claim 1, wherein the image converting condition includes a gradation converting condition to convert the scene luminance into a luminance of the visual image and a white balance correcting condition.

6. The image processing apparatus of claim 1, wherein the data analyzing section obtains or estimates a kind of a scene from the photographed image data.

7. The image processing apparatus of claim 1, wherein the data analyzing section obtains a provisional gradation converting condition for a specific viewing condition and obtains the gradation converting condition by revising the provisional gradation converting condition so as to conform the viewing condition.

8. The image processing apparatus of claim 1, wherein the data analyzing section obtains the image converting condition so as to indicate the visual image in a luminance-expanded color space.

9. The image processing apparatus of claim 1, wherein the formatting section attaches the image converting condition obtained by the data analyzing section and outputs the visual image data attached with the image, converting condition.

10. The image processing apparatus of claim 1, wherein the viewing condition parameter corresponding to the viewing condition for the visual image is a viewing condition parameter used in a color appearance model CIE-CAM97s or a color appearance model CIE-CAM02s.

11. The image processing apparatus of claim 1, further comprising:
    an operating section to input a user's viewing condition parameter,
    wherein the formatting section attaches the user's viewing condition parameter to the visual image data and outputs the visual image data attached with the user's viewing condition parameter.

12. An image processing method of converting photographed image data representing a scene luminance into visual image data representing a visual image, comprising:
    a data analyzing process to obtain a viewing condition to view a visual image, to analyze the photographed image data, and to obtain an image converting condition and a viewing condition parameter for a color management employing a color appearance model on the basis of the analysis result of the photographed image data and the viewing condition for the visual image;
    an image converting process to convert the photographed image data on the basis of the image converting condition obtained by the data analyzing process so as to produce the visual image data; and
    a formatting process to attach the viewing condition parameter to the visual image data produced by the image converting process and to output the visual image data attached with the viewing condition parameter.

* * * * *